United States Patent
Shimasaki et al.

(10) Patent No.: US 7,889,397 B2
(45) Date of Patent: Feb. 15, 2011

(54) IMAGE PROCESSING APPARATUS AND CONTROL METHOD THEREOF, AND READING METHOD IN IMAGE READING SYSTEM

(75) Inventors: Shin Shimasaki, Yokohama (JP); Koji Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 806 days.

(21) Appl. No.: 11/865,332

(22) Filed: Oct. 1, 2007

(65) Prior Publication Data

US 2008/0080020 A1 Apr. 3, 2008

(30) Foreign Application Priority Data

Oct. 2, 2006 (JP) .............................. 2006-271303
Jun. 12, 2007 (JP) .............................. 2007-155722

(51) Int. Cl.
*H04N 1/00* (2006.01)
*H04N 1/40* (2006.01)

(52) U.S. Cl. ..................................... 358/448; 358/3.28

(58) Field of Classification Search ................. 358/505, 358/443, 401, 448, 474, 475, 1.9, 449, 3.28
See application file for complete search history.

(56) References Cited

U.S. PATENT DOCUMENTS 6,634,558 B1 * 10/2003 Patel et al. ............. 235/472.01
2002/0070278 A1 * 6/2002 Hung et al. ............ 235/472.01
2005/0248668 A1 * 11/2005 Machida ..................... 348/239
2006/0066913 A1 * 3/2006 Nakashima ................. 358/448
2006/0083404 A1 * 4/2006 Shimosato .................. 382/100
2008/0163364 A1 * 7/2008 Ferlitsch ...................... 726/21

FOREIGN PATENT DOCUMENTS

| JP | 2002-278984 | | 9/2002 |
| JP | 2003-032488 | | 1/2003 |
| JP | 2004-080601 | | 3/2004 |
| JP | 2005210267 | * | 8/2005 |

* cited by examiner

*Primary Examiner*—Jerome Grant, II
(74) *Attorney, Agent, or Firm*—Fitzpatrick, Cella, Harper & Scinto

(57) ABSTRACT

In order to specify a region on an original on an original plate more accurately, an image processing apparatus, which reads an original placed on an original plate as digital image data using an image reading unit, includes a detection unit which detects a code image, that is recorded on an original and includes reading setting information, from an image read by a prescan using the image reading unit, an extraction unit which extracts the reading setting information from the detected code image, and a reading control unit which executes a main scan using the image reading unit based on the extracted reading setting information, and the reading setting information includes reading range information designated by a relative position to the original that records the code image with reference to the position and direction of the code image.

11 Claims, 22 Drawing Sheets

FIG. 17

INPUT SETTING
- ORIGINAL TYPE: PHOTO ▶
- ORIGINAL SIZE: ORIGINAL PLATE FULL SURFACE ▶
- COLOR MODE: COLOR ▶

OUTPUT SETTING
- OUTPUT RESOLUTION: 300dpi ▶

IMAGE SETTING (INDIVIDUAL) — 1703
- IMAGE NO.: 1 / 5
- READING SIZE: VERTICAL / HORIZONTAL
- READING POSITION: VERTICAL / HORIZONTAL
- IMAGE DIRECTION: RIGHT ▶

PRESCAN
SCAN

APPLICATION FORM
- NAME
- ADDRESS
- TELEPHONE NUMBER
- REQUIRED ARTICLE 301a, 301b 1701, 1702

IMAGE PROCESSING APPARATUS AND CONTROL METHOD THEREOF, AND READING METHOD IN IMAGE READING SYSTEM

BACKGROUND OF THE INVENTION

1. Field of the Invention

The present invention relates to an image processing technique and, more particularly, to a range setting technique of a reading region.

2. Description of the Related Art

Conventionally, image processing apparatuses which read originals placed on original plates of a scanner, copying machine, and the like as digital images are available. In an original detection method using an image processing apparatus, an original region is detected from the density distribution of image information after the entire surface of the original plate is read. According to this image processing apparatus, the position of an original placed on the original plate is automatically detected. For this reason, the user can specify a region to be read and can acquire a desired image without any operations for designating the region to be read or placing an original at a predetermined position on the original plate.

One may often want to read a specific information region alone from an original which includes specific text information (e.g., a personal name, telephone number, and e-mail address) like a business card. Sometimes, the contents of an original having a predetermined format such as a ledger sheet may include description errors. In this case, one may require an original form without any entries and may want to designate a part (format part in this case) of the original as a region to be read. In such a case, as a method of designating a specific region in a detected original, Japanese Patent Laid-Open No. 2003-32488 (reference 1) discloses a technique for embedding, in an original, position information from one end of the original, and specifying a region based on the position information.

Furthermore, when an original digital file of a paper original read by a scanner is available, one may want to save only the modified part of the read paper original. Japanese Patent Laid-Open Nos. 2002-278984 (reference 2) and 2004-080601 (reference 3) disclose techniques for detecting whether or not a paper original is modified by calculating the difference between image data generated based on an original digital file and that read by the scanner.

However, with the technique described in reference 1 above, when a change in density distribution between the original plate and an image printed on an original is small, the detection precision tends to drop. For example, when an arbitrary image is printed on the entire surface of an original like a photo or leaflet, since there is a density difference between the original plate and the original, detection of the boundary between the original plate and the original easily succeeds. On the other hand, in case of an original printed on a paper sheet which has a hue close to that of the original plate, detection of the boundary between the original plate and the original often fails. When detection of the boundary between the original plate and the original fails, the related art which holds a specific region in an original as position information from one end of the original cannot determine the specific region.

With the technique described in reference 2 or 3 above, an original digital file must be converted into image data to calculate the difference between the original digital file and read image data, resulting in a heavy processing load and long processing time.

SUMMARY OF THE INVENTION

The present invention has been made in consideration of the aforementioned problems, and has as its object to provide a technique that can specify a region of an original on an original plate with improved accuracy.

According to one aspect of the present invention, an image processing apparatus which reads an original placed on an original plate as digital image data using an image reading unit, comprising: a detection unit adapted to detect a code image, which is recorded on an original and includes reading setting information, from an image read by a prescan using the image reading unit; an extraction unit adapted to extract the reading setting information from the detected code image; and a reading control unit adapted to execute a main scan using the image reading unit based on the extracted reading setting information, wherein the reading setting information includes reading range information designated by a relative position to the original that records the code image with reference to a position and a direction of the code image.

According to another aspect of the present invention, a method of controlling an image processing apparatus which reads an original placed on an original plate as digital image data using an image reading unit, comprising: a detection step of detecting a code image, which is recorded on an original and includes reading setting information, from an image read by a prescan using the image reading unit; an extraction step of extracting the reading setting information from the detected code image; and a reading control step of executing a main scan using the image reading unit based on the extracted reading setting information, wherein the reading setting information includes reading range information designated by a relative position to the original that records the code image with reference to a position and a direction of the code image.

According to still another aspect of the present invention, a reading method in an image reading system, which comprises a reading unit adapted to read an original placed on an original plate as image information according to reading setting information, and an information code detection unit adapted to detect an information code from the image information, comprising: a step of acquiring size information of a specific region from the information code detected by the information code detection unit; a step of acquiring relative position information of the information code to the specific region from the information code; a step of generating the reading setting information based on the size information and the relative position information, and extracting information of the specific region from the image information; and a step of determining the presence/absence of a modification to the placed original based on the extracted information of the specific region, wherein the image information is discarded if the absence of a modification is determined in the determining step, and the image information is saved if the presence of a modification is determined in the determining step.

According to the present invention, the technique that can specify a region of an original on an original plate more accurately can be provided. Also, a technique which can determine whether or not a read original is modified and is different from the original data without requiring any heavy processing load and long processing time can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 shows an example of display of a reading setting window according to modification 2;

DESCRIPTION OF THE EMBODIMENTS

Preferred embodiments of the present invention will be exemplified in detail hereinafter with reference to the accompanying drawings. However, building components described in these embodiments are merely examples, and the scope of the present invention is not limited to them.

First Embodiment

An image reading apparatus as the first embodiment of an image processing apparatus according to the present invention will be described below.

<Apparatus Arrangement>

Figure 1:
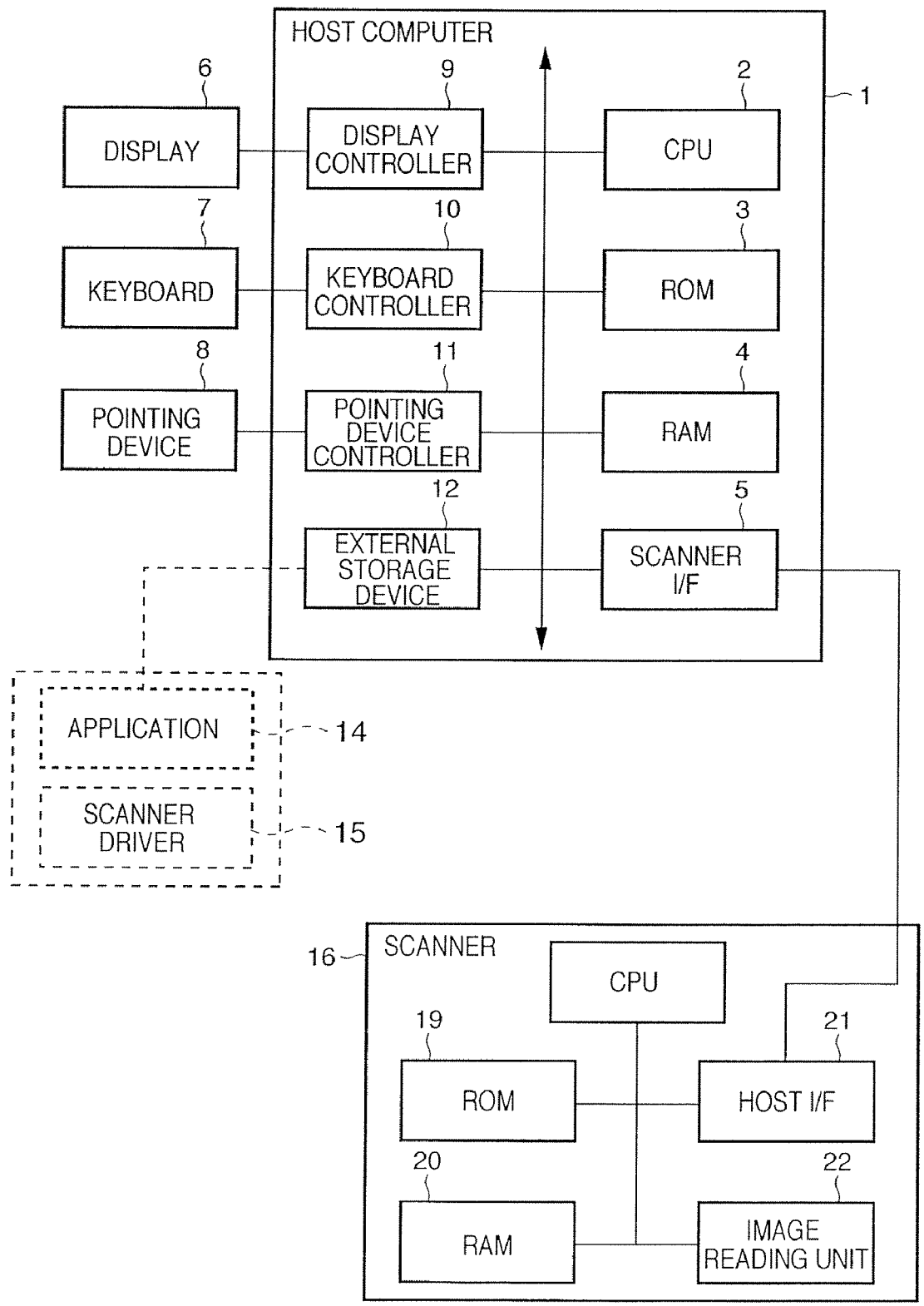
FIG. 1 is a block diagram of an image reading apparatus of the first embodiment.

FIG. 1 is a block diagram of an image reading apparatus of the first embodiment. This image reading apparatus (image reading system) comprises a host computer 1 and scanner 16.

The host computer 1 comprises a personal computer, workstation, or the like. The host computer 1 comprises a CPU 2, which loads and executes programs (firmware) stored in a ROM 3 upon startup. The CPU 2 loads an operating system (to be abbreviated as an OS hereinafter) stored in an external storage device 12 onto a RAM 4, and systematically controls the entire host computer 1 via a system bus 13. Reference numeral 9 denotes a display controller, which controls a display 6 that can make various kinds of display such as an error alert, processing state, and the like under the control of the CPU 2. Reference numeral 10 denotes a keyboard controller, which controls a keyboard 7 as an input device. Reference numeral 11 denotes a pointing device controller, which controls a pointing device 8 as an input device.

The external storage device 12 stores programs of an application 14 and scanner driver 15. The external storage device 12 stores read image data as digital files. Note that the application 14 is software which has a function of editing image data received from the scanner driver 15 according to user's operations. The scanner driver 15 is software which has a function of exchanging images with the application 14 that runs on the host computer 1 and the scanner 16, and generates commands and parameters to be set in the scanner 16 and transmits them to the scanner 16.

The scanner 16 comprises a CPU 17, ROM 19, RAM 20, host interface 21, and image reading unit 22. The CPU 17 loads, from the ROM 19, a program required to systematically control the scanner 16, and executes it. The image reading unit 22 reads an image of an original using a CCD line sensor, and converts the read image into a digital signal. The RAM 20 is a storage unit which temporarily stores the program loaded by the CPU 17, read image data, setting parameters of the image reading unit 22, and the like. Note that the host computer 1 and scanner 16 can communicate with each other by connecting a scanner interface 5 and host interface 21 via a cable 18 or a wireless interface (not shown).

Figure 2:
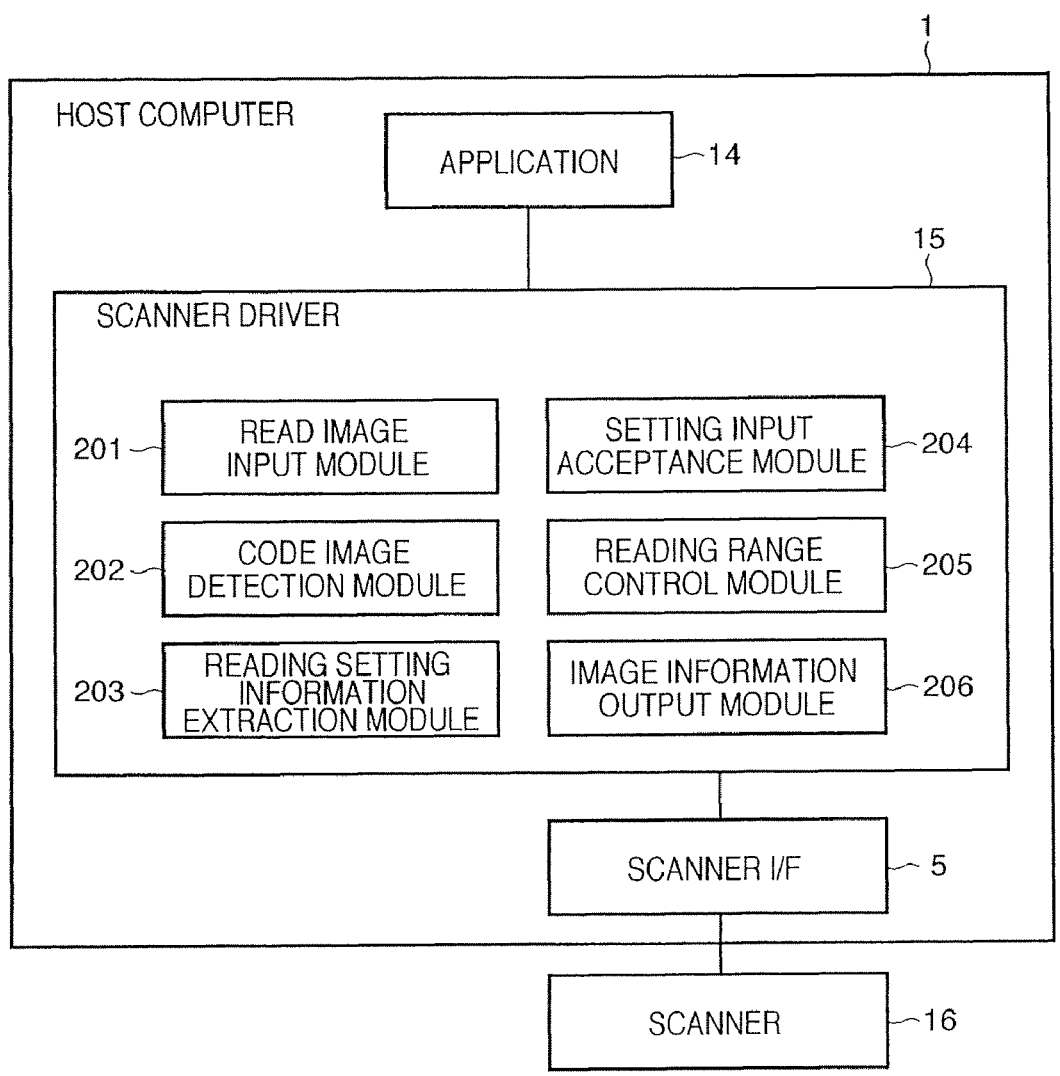
FIG. 2 is a functional block diagram inside a host computer.

FIG. 2 is a functional block diagram inside the host computer.

Functions to be implemented by the scanner driver 15 include a read image input module 201, code image detection module 202, reading setting information extraction module 203, setting input acceptance module 204, reading range control module 205, and image information output module 206.

The read image input module 201 is a function module which inputs image data read by the scanner 16 via the scanner I/F 5. The code image detection module 202 is a function module which detects an image of an information code (to be described later) from the input image. The reading setting information extraction module 203 is a function module which extracts reading setting information (to be described later) from the detected information code. The setting input acceptance module 204 is a function module which accepts various setting inputs from the user. The reading range control module 205 is a function module which controls the reading range upon main scan based on the reading setting information extracted from the image of the information code. Note that when "full surface" is set as the reading range, the full surface of an original plate corresponding to a readable range is set. The image information output module 206 is a function module which outputs the read image data under the control of the reading range.

<Information Code Image>

Figure 3:
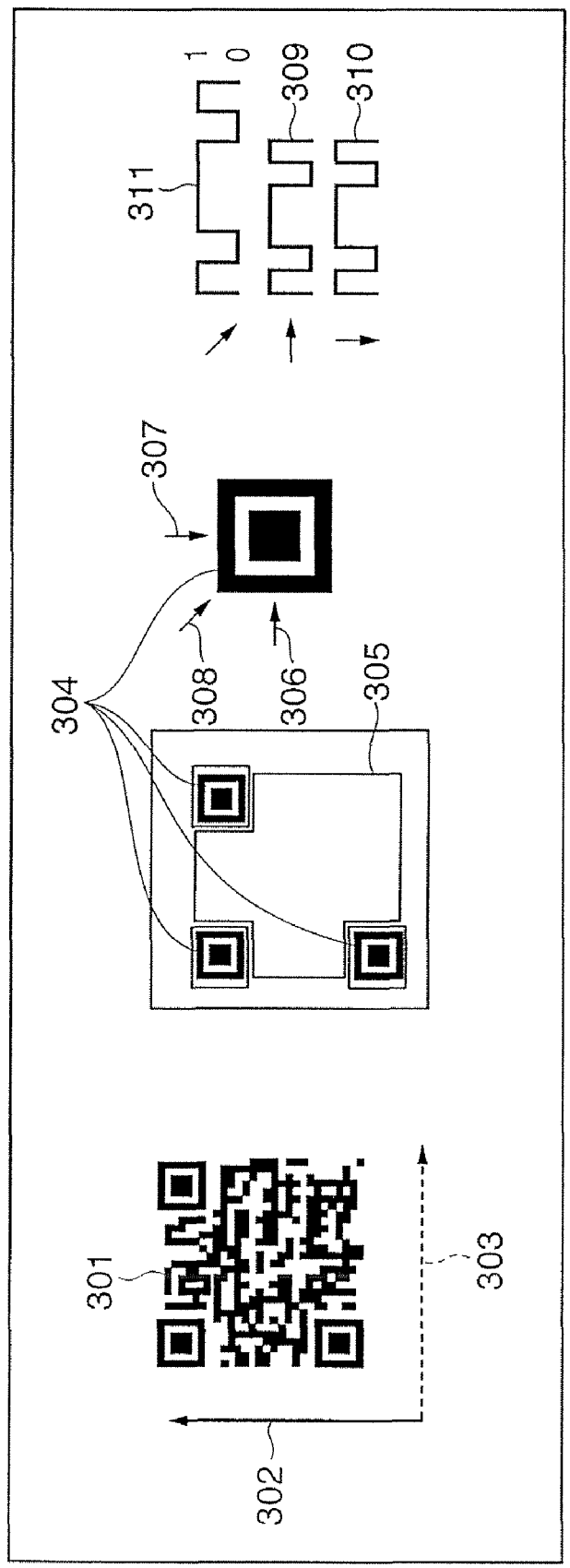
FIG. 3 is a view showing an example of an information code used in the image reading apparatus according to the first embodiment.

FIG. 3 shows an example of an information code used in the image reading apparatus according to the first embodiment.

Reference numeral 301 denotes an information code, which is obtained by printing squares of two values of black and white (white=0 and black=1) on a matrix. The information code 301 includes three alignment symbols 304. FIG. 3 shows an example in which the information code 301 is recorded as a QR (Quick Response) code. However, the present invention can be practiced using other codes such as PDF417, DataMatrix, AztecCode, MaxiCode, and the like. Also, a unique information code may be defined and used.

Reference numeral 302 denotes a direction indicating a normal position of the information code. The normal position corresponds to a state in which the three alignment symbols 304 are located at the upper left, upper right, and lower left positions. Reference numeral 303 denotes a direction perpendicular to the normal position direction of the information code. That is, the information code 301 can define a direction with reference to the information code 301 itself.

The read image of each alignment symbol 304 becomes data of a predetermined pattern irrespective of the angle (tilt) of a scan direction. This example shows a case in which the symbol 304 is scanned from three directions, i.e., a horizontal direction 306, vertical direction 307, and oblique direction (−45° with respect to the horizontal direction) as the angles of the scan direction. Upon scanning in the horizontal direction, binary data 309 includes a pattern of white, black, white, black, black, black, white, black, and white, and binary data 310 in the vertical direction and binary data 311 in the oblique direction have the same pattern. Hence, the alignment symbol 304 can be detected by only scan processing in one direction irrespective of the scan direction of the information code 301. Likewise, by detecting the three alignment symbols 304, a region and orientation of the information code 301 can be specified. Note that FIG. 3 shows three examples of the horizontal direction (0°) vertical direction (90°), and oblique direction (−45°) as the angles of the scan direction. However, even when the scan direction has an arbitrary angle, the alignment symbol 304 can be detected by the same processing.

Figure 4:
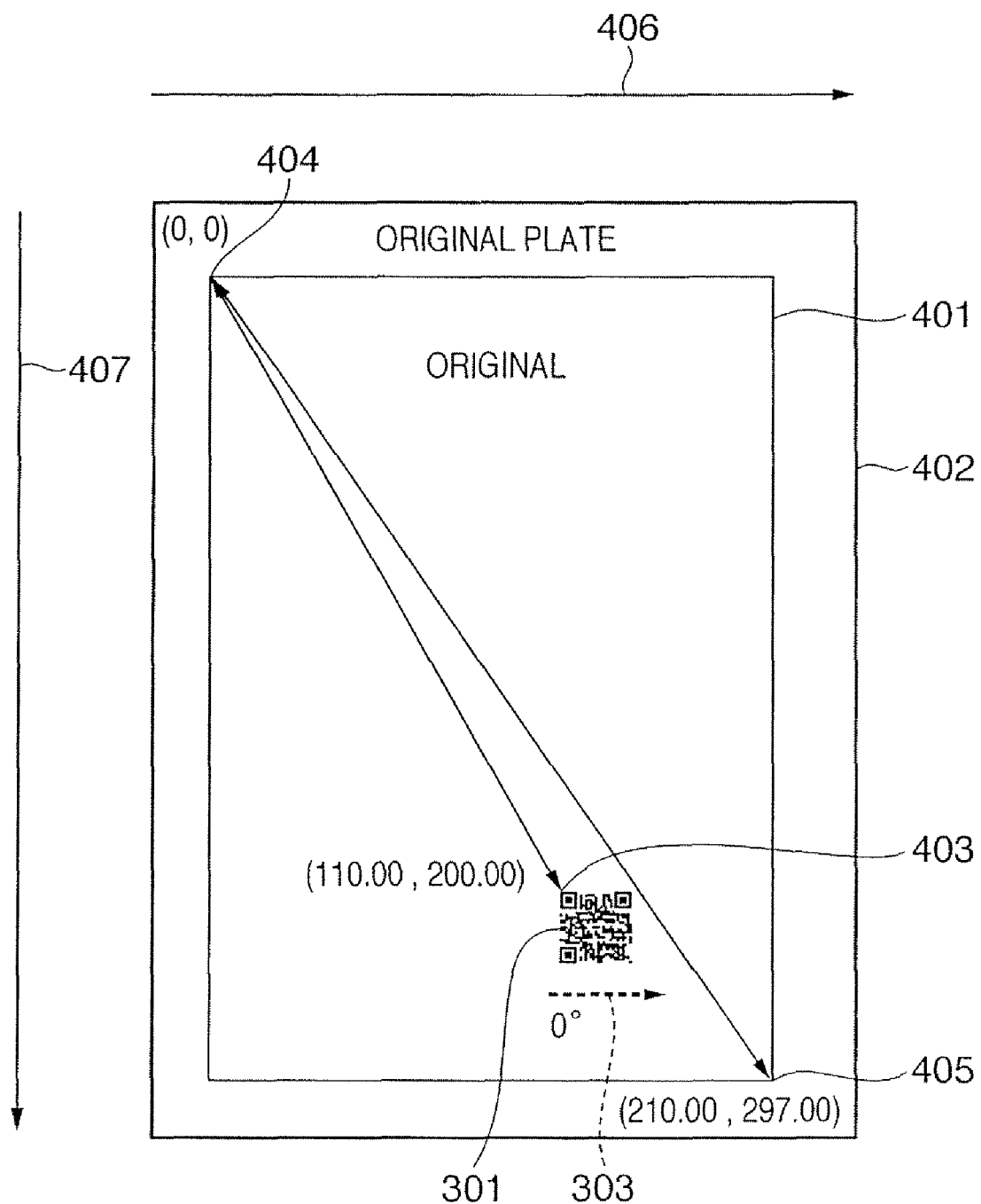
FIG. 4 is a view conceptually showing an original plate of the image reading apparatus according to the first embodiment, and an original on which the information code is printed.

FIG. 4 conceptually shows an original plate of the image reading apparatus according to the first embodiment, and an original on which the information code is printed.

Reference numeral 401 denotes an original; and 402, an original plate on which the original 401 is placed. An arrow 406 represents "main scan direction", i.e., a direction in which the image reading unit 22 electrically scans upon reading the original 401 on the original plate 402. An arrow 407 represents "sub-scan direction" perpendicular to the main scan direction 406. In the sub-scan direction 407, the image reading unit 22 mechanically scans. In this way, the full surface of the original plate 402 can be scanned, and an RGB color image for the full surface of the original plate 402 can be acquired.

The aforementioned information code 301 is printed on the original 401. The information code 301 has a reference point 403 which serves as a reference of a relative position to the original 401, and a reference direction 303 which serves as a reference of a relative angle to the original 401. An origin 404 of the original 401 represents one vertex of the original 401, and is calculated based on relative position information from the reference point held in the information code 301, the reference direction, and relative angle information to the reference direction held in the information code 301.

Reference numeral 405 denotes a diagonal vertex of the origin 404 of the original 401. This vertex 405 is calculated based on the origin 404 of the original and size information of the original 401 in the information code 301. In the example shown in FIG. 4, the original 401 has an A4 size (210.00 mm (horizontal)×297.00 mm (vertical). Relative position coordinates of the information code 301 represent a position of 110.00 mm in the main scan direction and 200.00 mm in the sub-scan direction from the origin 404 of the original 401. The angle of the information code 301 is 0° with respect to the original 401.

Note that the first embodiment will give an explanation under the assumption that reading range information that designates the full surface of the original 401 is designated as reading setting information. However, a partial image region, text information region, and the like in the original may be a ranged designated by the reading setting information.

Figure 6:
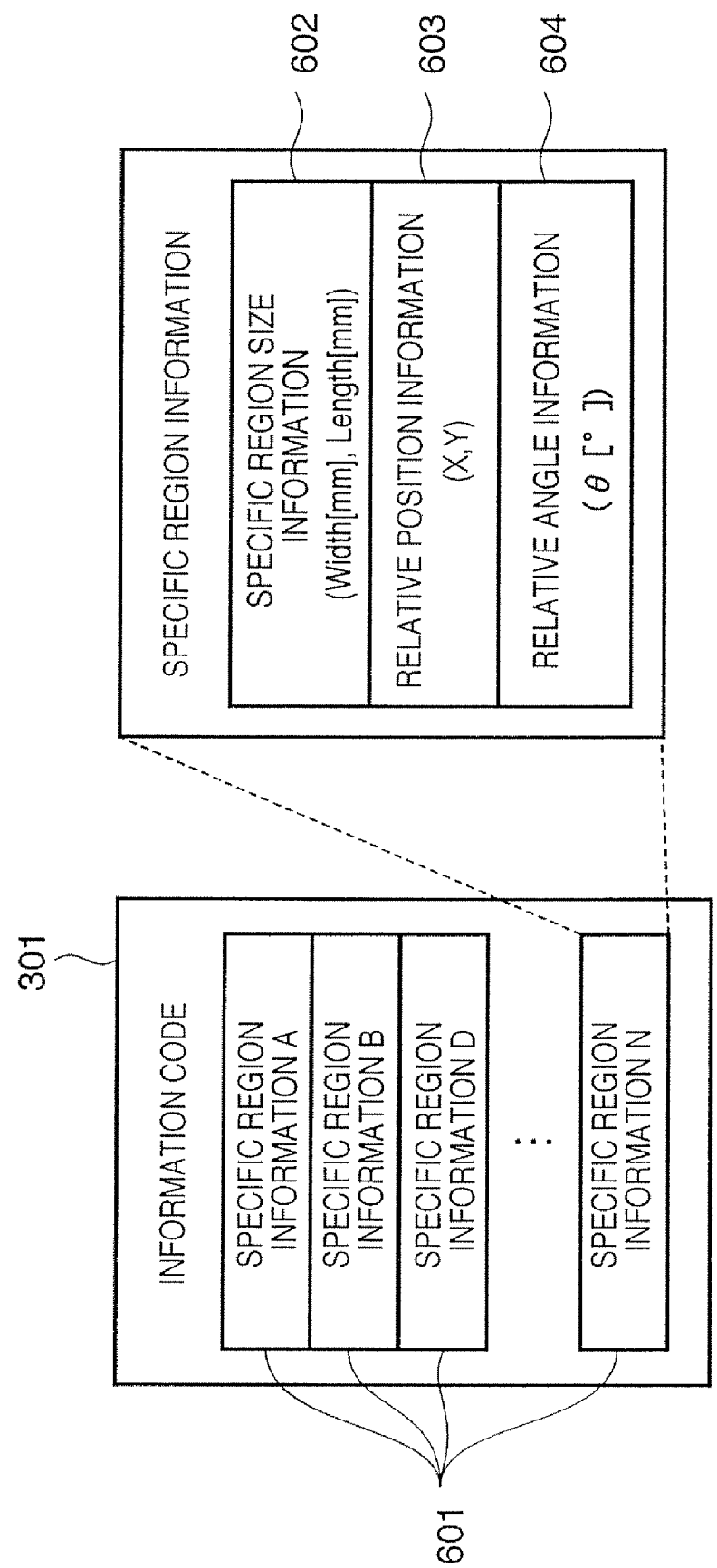
FIG. 6 is a view for explaining a data structure which is encoded and stored in the information code.

FIG. 6 is a view for explaining a data structure which is encoded and stored in the information code 301.

The information code 301 has one or more pieces of specific region information 601 as reading setting information. Each specific region information 601 includes specific region size information 602, relative position information 603, and relative angle information 604.

The specific region size information 602 holds the main scan direction and sub-scan direction of a specific region in a unit ("millimeters" in this case) designated in advance. The relative position information 603 holds coordinates where the information code 301 is printed when a certain vertex of the original (in this case, the upper left vertex with reference to the information code 301) is defined as an origin. The relative angle information 604 holds an angle through which the information code 301 is rotated counterclockwise upon printing with respect to the horizontal direction of a specific region in a unit ("degrees" in this case) designated in advance.

Note that the following explanation will be given under the assumption that the information code 301 has the data structure shown in FIG. 6. However, the data structure of the information code 301 is not limited to this. That is, the data structure need only include information that associates the position of the information code 301 with the relative position and size of each specific region.

<Operation of Image Reading Apparatus>

Figure 5:
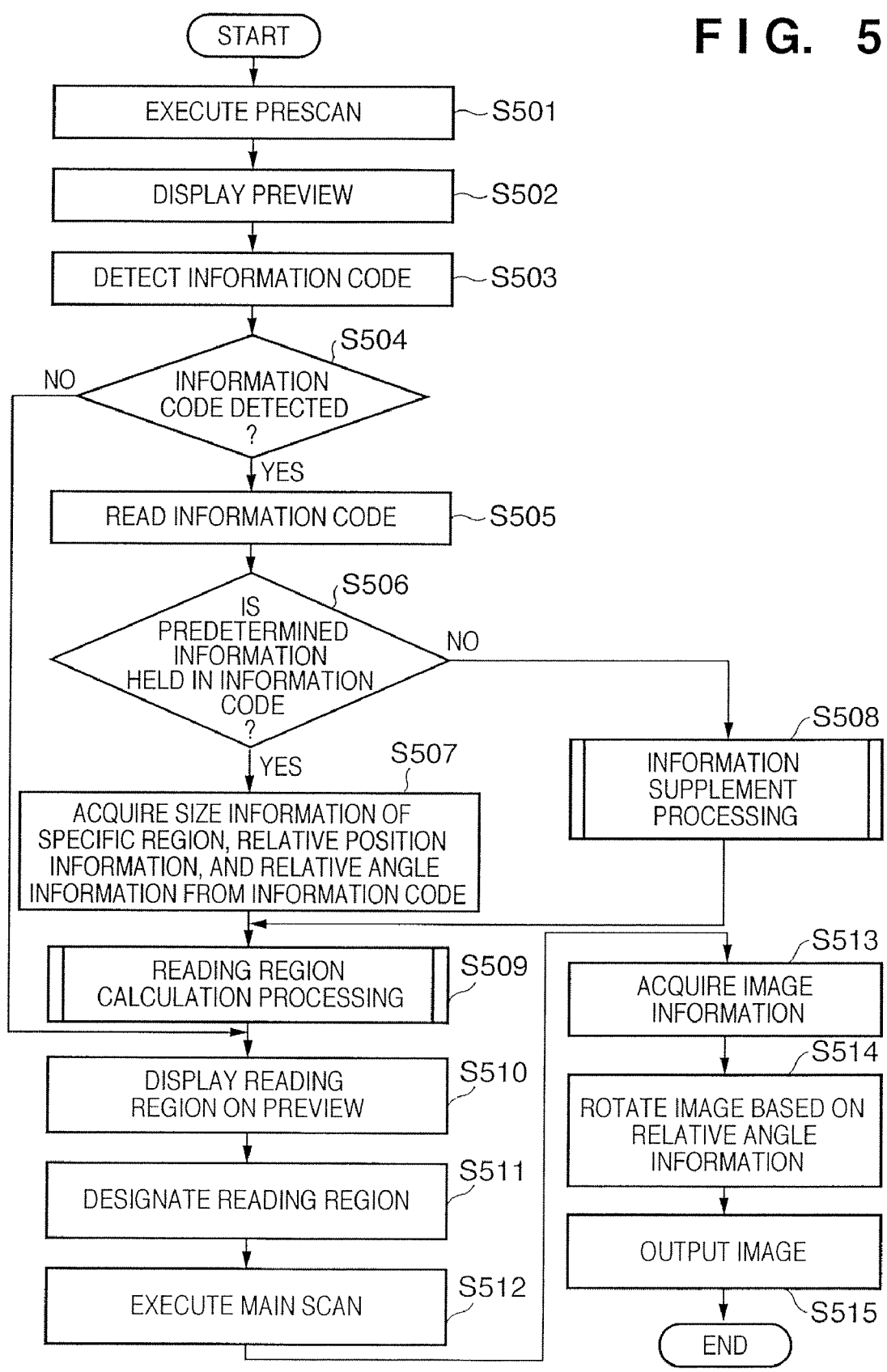
FIG. 5 is a flowchart showing the operation of the image reading apparatus according to the first embodiment.

FIG. 5 is a flowchart showing the operation of the image reading apparatus according to the first embodiment. Note that the steps to be described below are implemented when the CPU 2 executes a program to control the host computer 1 or scanner 16. That is, the CPU 2 also serves as reading control means.

In step S501, the CPU 2 controls the image reading unit 22 to read an image on the full surface of the original plate including an original image as a color image, and to acquire an RGB color image (digital image data). This operation is also called a prescan, i.e., processing for quickly acquiring image information by executing a scan while setting a lower resolution than a main scan. More specifically, the prescan is executed at a reading resolution as high as the information code 301 can be detected, as will be described later. The scanner driver 15 acquires image information of the full surface of the original plate from the scanner 16 via the cable 18 through the prescan.

Figure 10:
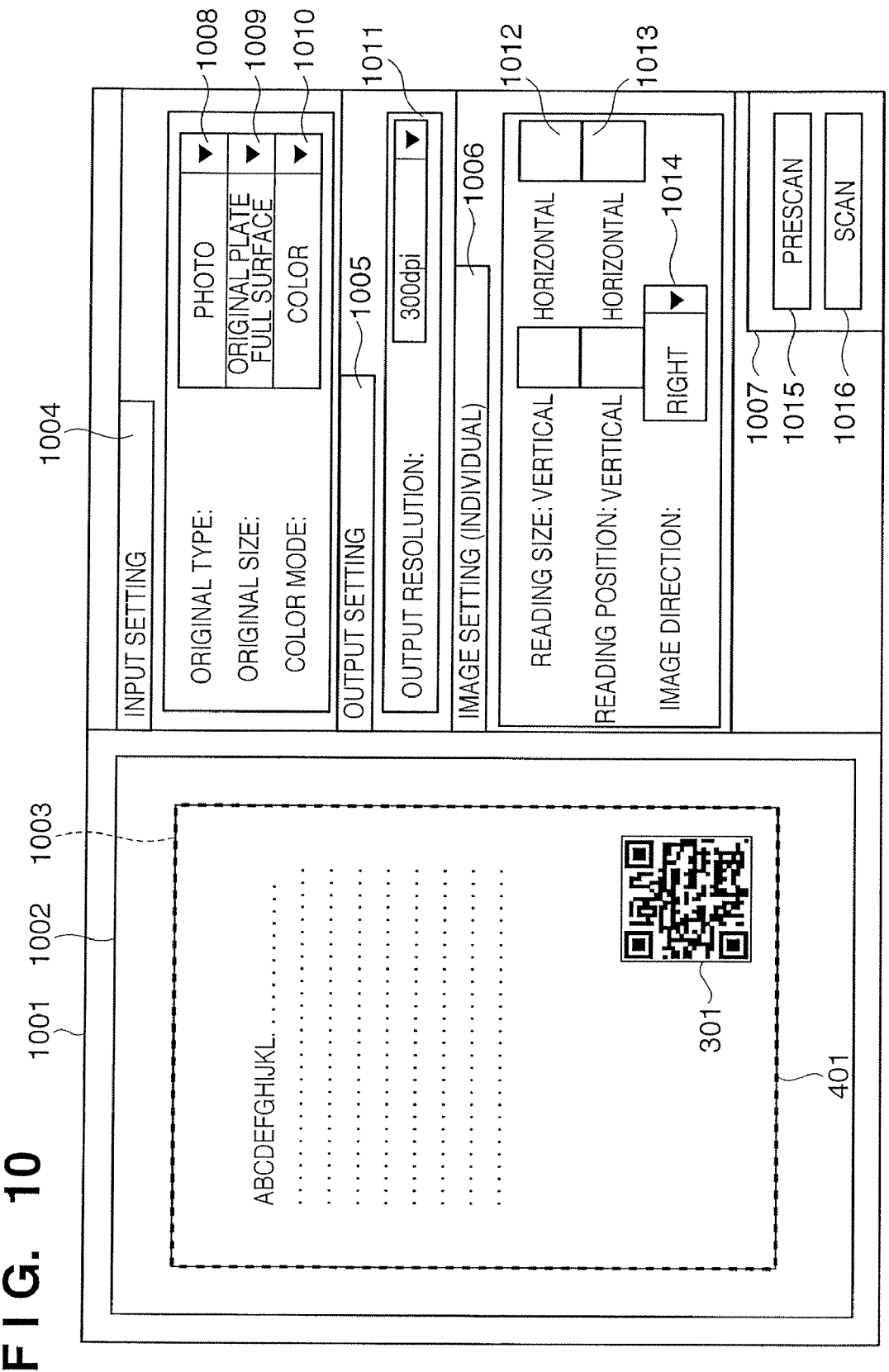
FIG. 10 shows an example of a reading setting window displayed on a display 6 of the image reading apparatus according to the first embodiment.

In step S502, the CPU 2 displays the RGB color image acquired in step S501 on the display 6. More specifically, the CPU 2 temporarily saves the image information of the full surface of the original plate, which is acquired in step S501 and is input by the read image input module 201, in the RAM 4 or external storage device 12, and displays it on the display 6. The scanner driver 15 displays the image information of the full surface of the original plate on a reading setting window 1001 on the display 6 (FIG. 10). The reading setting window 1001 is a function module which displays the image information of the full surface of the original plate, and accepts, from the user, settings of the reading method, a region to be read, and the like when the scanner 16 reads the original. The image information of the original plate obtained by the prescan will be referred to as a preview image hereinafter. Note that details of the reading setting window 1001 will be described later. By displaying on the display 6 the image information acquired by executing the prescan, the user can recognize the size, position, and the like upon executing a main scan, and can easily make scan settings.

In step S503, the code image detection module 202 detects the information code 301 from the preview image acquired in step S501. More specifically, the module 202 converts the preview image into, e.g., a black-and-white binary image, and searches for and detects an image that matches a specific pattern by predetermined arithmetic operations. Note that the black-and-white binary image means an image that expresses each pixel by 1 bit; "0" for white and "1" for black. Note that conversion into the black-and-white binary image is implemented by comparing the G components of respective pixels in the RGB color image (scan data) with a threshold which is set in advance. Note that the threshold is preferably set so that a white image is obtained when an image is read without placing any original on the original plate.

The code image detection module 202 checks in step S504 if the information code 301 is detected in step S503. If the information code 301 is detected, the process advances to step S505; otherwise, the process jumps to step S510.

In step S505, the code image detection module 202 extracts the information code 301 detected in step S503, and reads out encoded reading setting information (specific region information 601). The module 202 temporarily stores the readout information in the RAM 4.

The reading setting information extraction module 203 checks in step S506 if the information code 201 read out in step S505 holds information with the data structure designated in advance. More specifically, the module 203 confirms whether or not the information code 301 holds information with the data structure described with reference to FIG. 6. If the information code includes all pieces of information described with reference to FIG. 6, the process advances to step S507; if there are some pieces of short information, the process advances to step S508. Note that details of information code supplement processing in step S508 will be described later with reference to FIG. 7.

In step S507, the reading setting information extraction module 202 acquires the specific region size information 602, and the relative position information 603 and relative angle information 604 of the information code 301 with respect to a specific region.

In step S509, the reading range control module 205 derives reading regions based on the information acquired in step S507 or S508. That is, the module 205 derives the reading regions from the specific region size information 602, and the relative position information 603 and relative angle information 604 of the information code 301 with respect to the specific region. Note that details of this reading region calculation processing will be described later with reference to FIG. 9.

In step S510, the CPU 2 displays the reading region derived in step S509 on the reading setting window 1001 on the display 6. If it is determined in step S504 that no information code 301 is found, the CPU 2 accepts user's settings on the reading setting window 1001, and displays a reading region according to the settings.

In step S511, the reading range control module 205 designates one region displayed in step S510. For example, if the information code 301 stores a plurality of specific regions, the module 205 accepts user's choice from the reading setting window 1001, and designates the region. If the information code 301 stores only one specific region, the module 205 may automatically designate that specific region.

In step S512, the scanner driver 15 executes a main scan. The main scan to be executed in this step means acquisition of image information of the region designated in step S511. The scanner driver 15 moves the image reading unit 22 in the sub-scan direction to a position indicated by an address based on the coordinates of the designated specific region information, and then reads the original by then moving the image reading unit 22 in the main scan direction.

In step S513, the scanner driver 15 acquires the image information acquired by the main scan executed in step S512 from the scanner 16 via the cable 18.

In step S514, the CPU 2 applies rotation processing to the image information acquired in step S513 based on the relative angle information stored in the information code 301. More specifically, the CPU 2 sets a rotation angle based on the relative angle information and reference direction. For example, when the difference between the relative angle information and reference direction is 90°, the CPU 2 rotates the image information clockwise through 90°. Likewise, if the difference is 180°, the CPU 2 rotates the image information through 180°. In the case of 180° image information rotation, the CPU 2 implements rotation processing by reversing the main scan direction and sub-scan direction. Note that the CPU 2 may skip this step according to user's designation.

In step S515, the image information output module 206 outputs the image information (image data). The output image information is saved in the external storage device 12 as a digital file or is transmitted to the application 14.

With the above operation, image information of a region which is designated based on information stored in the information code 301 can be output.

<Detailed Operation of Information Code Supplement Processing>

Figure 7:
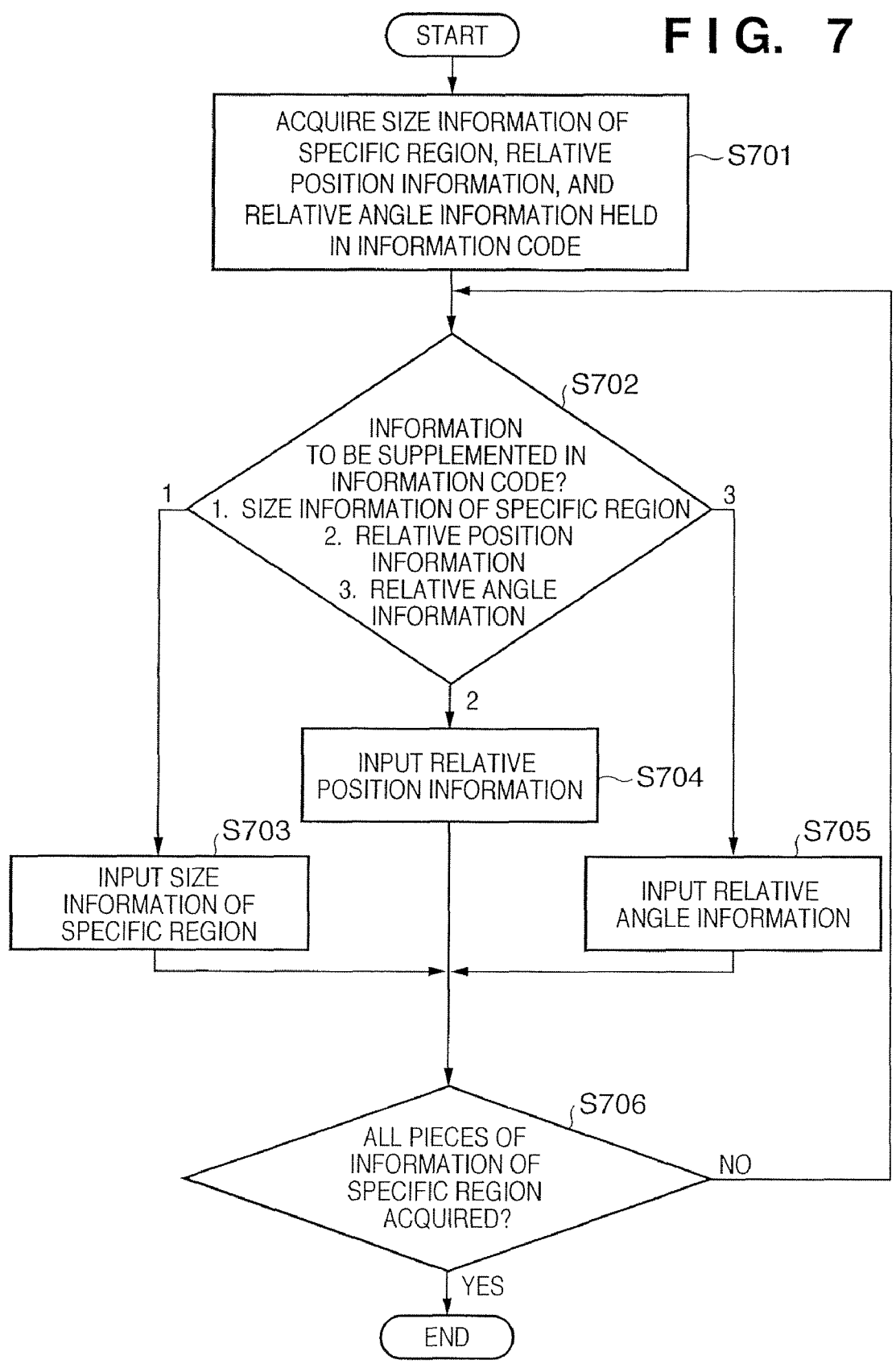
FIG. 7 is a detailed flowchart of information supplement processing.

FIG. 7 is a detailed flowchart of the information supplement processing corresponding to step S508.

In step S701, the CPU 2 acquires the specific region size information 602, relative position information 603, and relative angle information 604 held in the information code 301.

In step S702, the CPU 2 determines information that cannot be acquired from the information code 301 in step S701. If the specific region size information 602 cannot be acquired, the CPU 2 accepts input of specific region size information from the user via the reading setting window 1001 in step S703. If the relative position information 603 cannot be acquired, the CPU 2 accepts input of relative position information of the specific region from the user via the reading setting window 1001 in step S704. If the relative angle information 604 cannot be acquired, the CPU 2 accepts input of relative angle information of the specific region via the reading setting window 1001 in step S705.

The CPU 2 checks in step S706 if all of the specific region size information 602, relative position information 603, and relative angle information 604 are acquired. If all of these pieces of information are not acquired yet, the process returns to step S702 to determine information to be supplemented again.

<Detailed Operation of Reading Region Calculation Processing>

Figure 8:
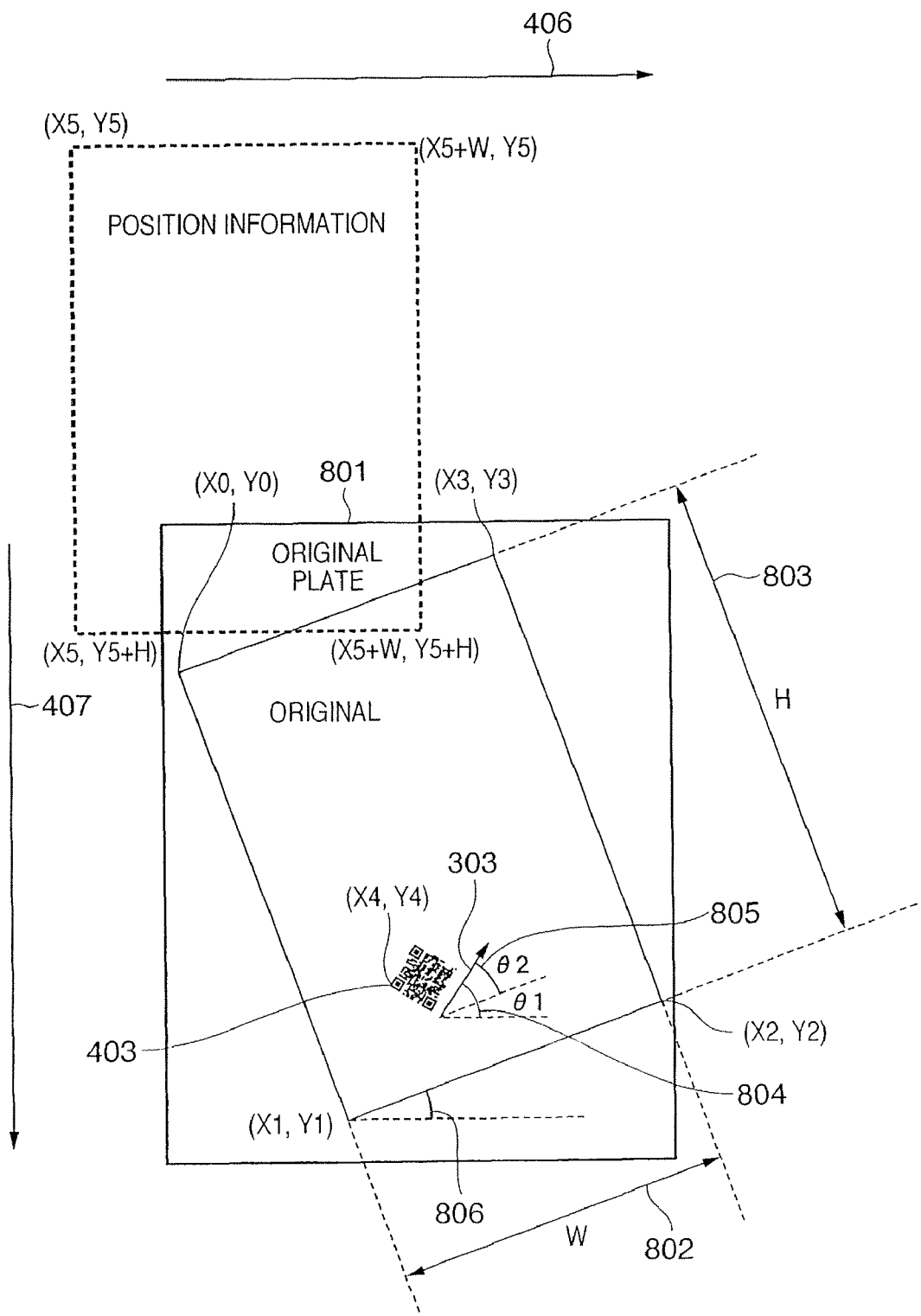
FIG. 8 is a view exemplifying the relationship between the original plate and a specific region.

FIG. 8 exemplifies the relationship between the original plate and specific region (the full surface of an original in this case).

The reading region calculation processing handles the original plate and specific reading region on a two-dimensional coordinate system. Assume that the main scan direction 406 is defined as an X-axis, the sub-scan direction 407 is defined as a Y-axis, and the coordinates of the upper left corner of an original plate 801 are defined as an origin (0, 0) of the original plate. The coordinates (X0, Y0) to (X3, Y3) represent the four vertices of the reading region to be calculated by the reading region calculation processing. Coordinates (X4, Y4) represent a reference point indicated by the detected information code, and relative position coordinates are determined based on this coordinate position. Coordinates (X5, Y5), (X5+W, Y5), (X5, Y5+H), (X5+W, Y5+H) represent position information indicated by the information code while the origin is defined as a reference point, and the rotation angle is not considered.

Reference numerals 802 and 803 respectively denote size information of the reading region indicated by the information code, and a specific reading region is determined based on these values. That is, reference numeral 802 denotes size information W (abbreviation for Width) in the horizontal direction of the reading region; and 803, size information H (abbreviation for Height) in the vertical direction of the reading region.

Reference numeral 804 denotes an angle indicating the reference direction 303 of the information code with respect to the main scan direction 406. Assume that the angle 804 is defined as an angle $\Theta 1$. Reference numeral 805 denotes an angle indicating the reference direction 303 of the information code with respect to the horizontal direction of the reading region. Assume that the angle 805 is defined as an angle $\Theta 2$. Reference numeral 806 denotes an angle of the reading region with respect to the original plate. The angle 806 is determined by the difference between $\Theta 2$ and $\Theta 1$. Assume that the angle 806 is defined as $\Theta$. The rotation processing of the specific reading region is executed according to the angle $\Theta$ 806.

Figure 9:
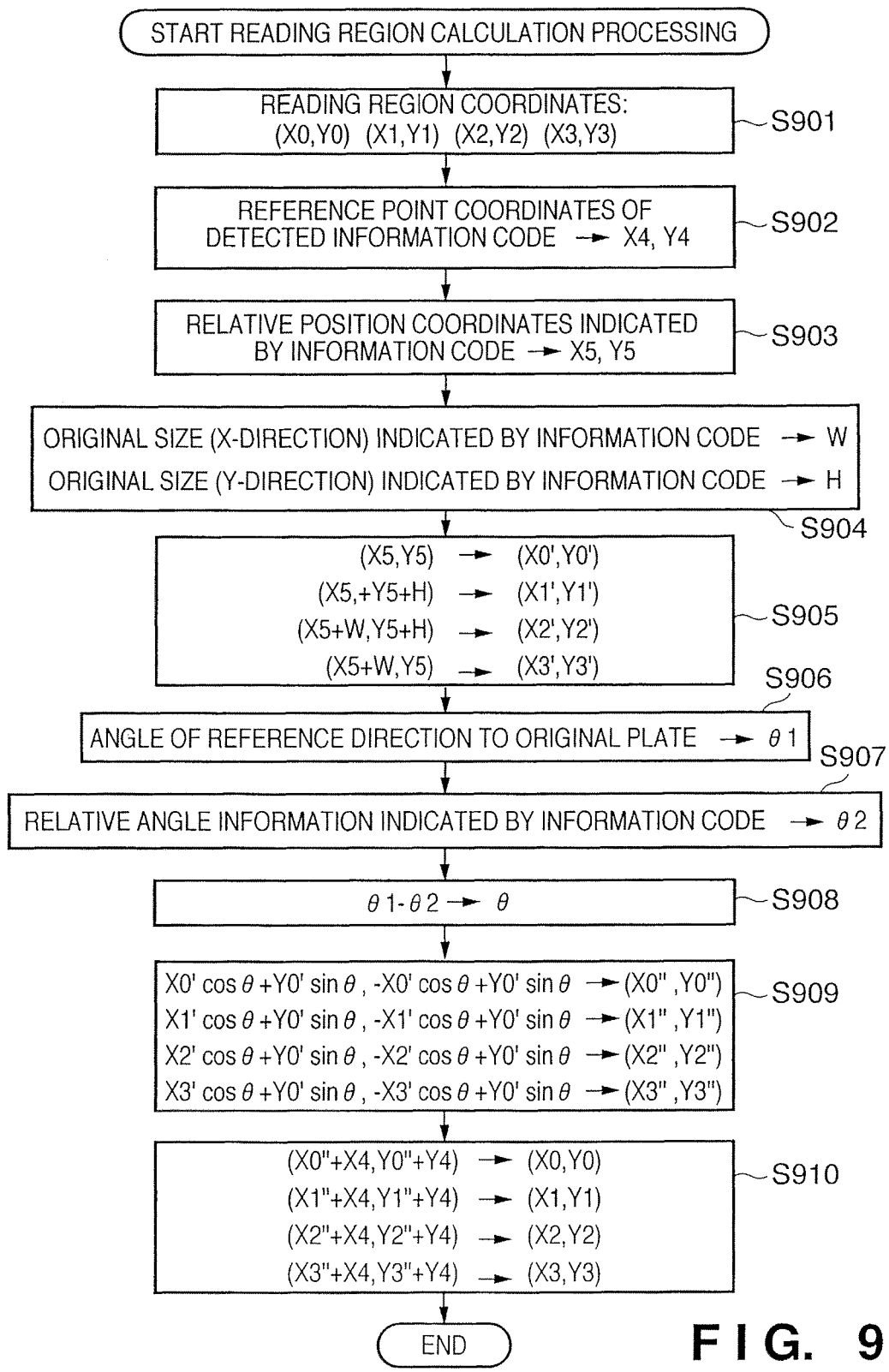
FIG. 9 is a detailed flowchart of reading region calculation processing.

FIG. 9 is a detailed flowchart of the reading region calculation processing corresponding to step S509. Note that, as in FIG. 8, the coordinate system is set to have the coordinates of the upper left corner of the original plate 801 as the origin (0, 0), the main scan direction 406 as the X-axis, and the sub-scan direction 407 as the Y-axis in the following description.

In step S901, the reading range control module 205 assures an array of the four vertex coordinates of the reading region to be derived in turn from the coordinates located at the upper left corner of FIG. 8 counterclockwise to be (X0, Y0), (X1, Y1), (X2, Y2), and (X3, Y3).

In step S902, the reading range control module 205 acquires the coordinates of the reference point 403 of the information code 301 detected in step S503 and stores them as (X4, Y4).

In step S903, the reading range control module 205 acquires coordinates representing one end of the specific region from the information code 301, and sets them as (X5, Y5). Since the information code 301 holds the relative position information 603 to the reading region, the module 205 converts the coordinates (X5, Y5) using the coordinates (X4, Y4) of the reference point as the origin (0, 0) of the specific region. In the example shown in FIG. 4, since the information code 301 holds (110.00, 200.00) as the relative position information 603, (X5, Y5)=(−110.00, −200.00) in this processing.

In step S904, the reading range control module 205 acquires the specific region size information 602 from the information code 301.

In step S905, the reading range control module 205 calculates the following four temporary vertex coordinates based on the relative position information and specific region size information 602:

$$(X5, Y5) \rightarrow (X0', Y0')$$

$$(X5, Y5+H) \rightarrow (X1', Y1')$$

$$(X5+W, Y5+H) \rightarrow (X2', Y2')$$

$$(X5+W, Y5) \rightarrow (X3', Y3')$$

In step S906, the reading range control module 205 acquires an angle of the reference direction 303 in the detected information code with respect to the original plate as $\Theta 1$. The module 205 can derive this angle from the coordinates of the alignment symbols 304.

In step S907, the reading range control module 205 acquires the relative angle information 604 in the information code 301 as $\Theta 2$.

In step S908, the reading range control module 205 derives the rotation angle the specific region makes with the original plate as $\Theta$ based on the reference direction 303 and relative angle information 604 acquired in steps S906 and S907. More specifically, the module 205 derives that angle by $\Theta 1 - \Theta 2 \rightarrow \Theta$.

In step S909, the reading range control module 205 rotates the four temporary vertex coordinates calculated in step S905 through the angle $\Theta$ to have the origin (=reference point) of the specific reading region as the center. More specifically, the module 205 derives as follows.

$$(X0' \cos \Theta + Y0' \sin \Theta, -X0' \sin \Theta + Y0' \cos \Theta) \rightarrow (X0'', Y0'')$$

$$(X1' \cos \Theta + Y1' \sin \Theta, -X1' \sin \Theta + Y1' \cos \Theta) \rightarrow (X1'', Y1'')$$

$$(X2' \cos \Theta + Y2' \sin \Theta, -X2' \sin \Theta + Y2' \cos \Theta) \rightarrow (X2'', Y2'')$$

$$(X3' \cos \Theta + Y3' \sin \Theta, -X3' \sin \Theta + Y3' \cos \Theta) \rightarrow (X3'', Y3'')$$

In step S910, the reading range control module 205 converts the four vertex coordinate values calculated in step S909 into coordinate values having the original plate as a reference. More specifically, the module 205 adds the deviations of the reference point in the X- and Y-directions acquired in step S902 to the four vertex coordinate values to have the coordinates of the upper left corner of the original plate as the origin (0, 0).

$$(X0''+X4, Y0''+Y4) \rightarrow (X0, Y0)$$

$$(X1''+X4, Y1''+Y4) \rightarrow (X1, Y1)$$

$$(X2''+X4, Y2''+Y4) \rightarrow (X2, Y2)$$

$$(X3''+X4, Y3''+Y4) \rightarrow (X3, Y3)$$

With the above operation, the coordinates of the specific region with reference to the original plate can be derived.

<Reading Setting Window Example>

FIG. 10 shows an example of the reading setting window displayed on the display 6 of the image reading apparatus according to the first embodiment.

Reference numeral 1001 denotes a reading setting window, which includes a preview area 1002 that displays image information read by the scanner 16. Also, the window 1001 includes an input setting area 1004, output setting area 1005, image setting area 1006, and button operation area 1007 used to issue operation instructions to the scanner 16. The user inputs setting values using the pointing device 8 and keyboard 7 while visually confirming the reading settings displayed on the respective setting areas 1004 to 1006.

The preview area 1002 displays image information read by the scanner 16 by a prescan. The area 1002 displays image information on the original plate 402 and a reading region 1003 set based on the information code 301.

The input setting area 1004 accepts settings of an original type 1008, original size 1009, and color mode 1010. When the user selects the original type 1008 using the pointing device 8, a scan suited to the original type 1008 is executed. For example, if the original 401 is a photo, strong tone correction is applied to obtain smooth tonality suited to a photo. If the original 401 is a text original, tone correction is applied to emphasize character edges.

The example shown in FIG. 10 shows a case in which the user selects "photo" as the original type 1008. When the user selects the original size 1009, he or she selects the reading region 1003 on the original plate 402. For example, in case of the full surface of the original plate 402, the entire original plate 402 is scanned to acquire image information. Upon selecting "A4" as a standard size, an A4-sized region is read from one end on the original plate 402. This example shown in FIG. 10 shows a case in which the user selects "original plate full surface". When the user selects the color mode 1010 using the pointing device 8, he or she designates whether the original 401 to be read is read in a color or grayscale mode. The example shown in FIG. 10 shows a case in which the user selects "color".

The output setting area 1005 allows the user to make output settings of the read image. Upon selecting an output resolution 1011 using the pointing device 8, the area 1005 accepts a setting of the resolution of image information to be output. In this example, the user selects "300 dpi".

The image setting area 1006 allows the user to make settings for image information. A reading size 1012 displays the size of the reading region 1003 calculated based on the information code 301. The user can change the values of the reading region 1003 by inputting numerical values using the keyboard 7. A reading position 1013 displays a reading start position calculated based on the information code 301. The user can change the values of the reading position by inputting numerical values using the keyboard 7. Upon selecting an image direction 1014 using the pointing device 8, the user can set, as the top, a direction (one side of an image region) of the original 401 placed on the original plate 401 upon outputting image information. The rotation processing is applied to image information to be acquired by a main scan based on the set information of the image direction 1014. In this example, the image direction 1014 is "right".

A prescan button 1015 is used to execute a prescan. Upon clicking the prescan button 1015 by the pointing device 8, the scanner 16 executes a prescan, and the host computer 1 acquires prescan image information via the cable 18. When a prescan image is acquired, prescan image information is displayed on the preview area 1002.

A scan button 1016 is used to execute a main scan. Upon clicking the scan button 1016 by the pointing device 8, the scanner 16 executes a main scan, and the host computer 1 acquires main scan image information via the cable 18.

FIGS. 11 to 14 exemplify four cases in which the direction of characters on a text original is different from the reference direction 303 in the information code 301.

Figure 11:
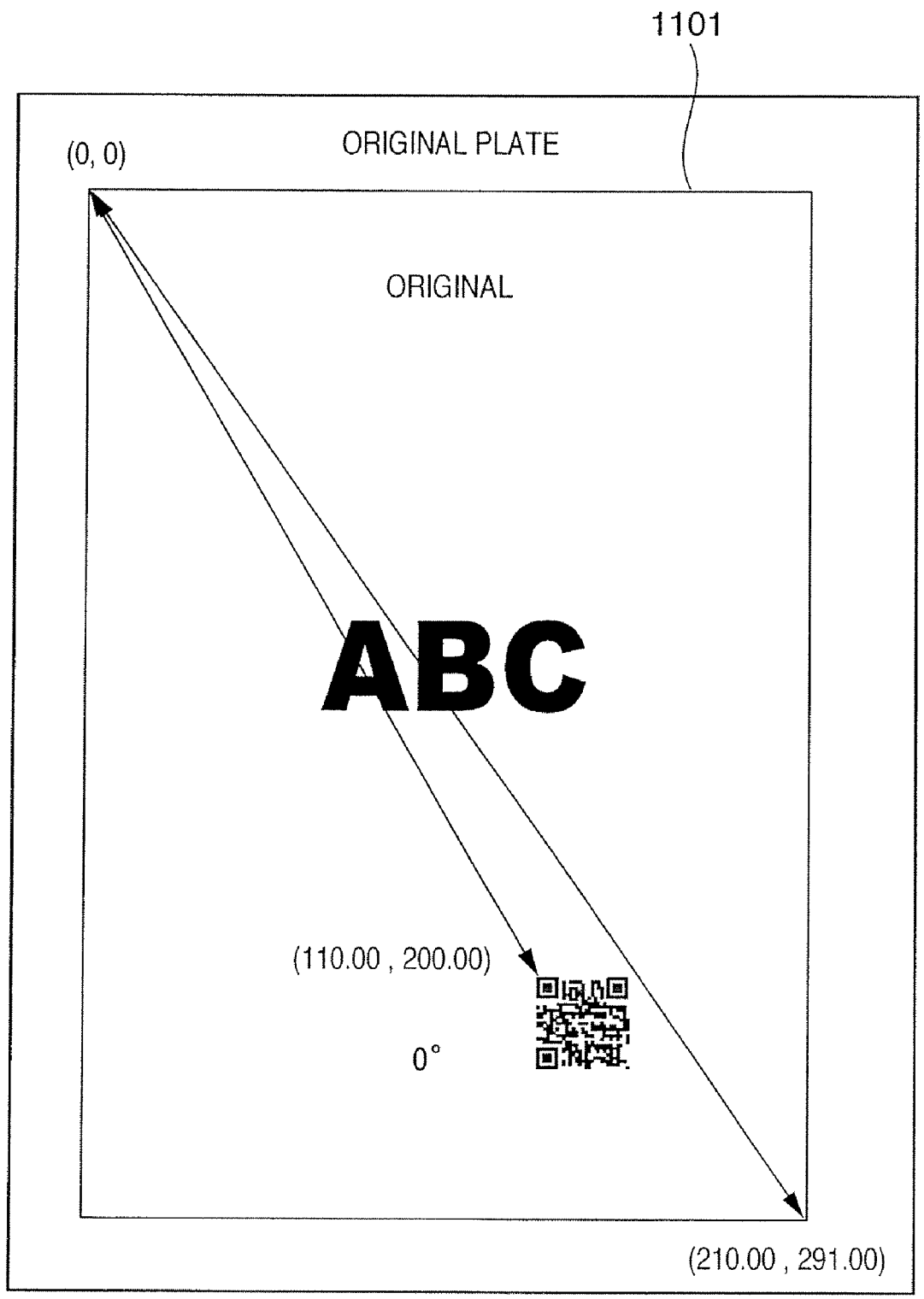
FIG. 11 is a view exemplifying one of four cases in which the direction of characters of a text original is different from a reference direction 303 of the information code.
Figure 12:
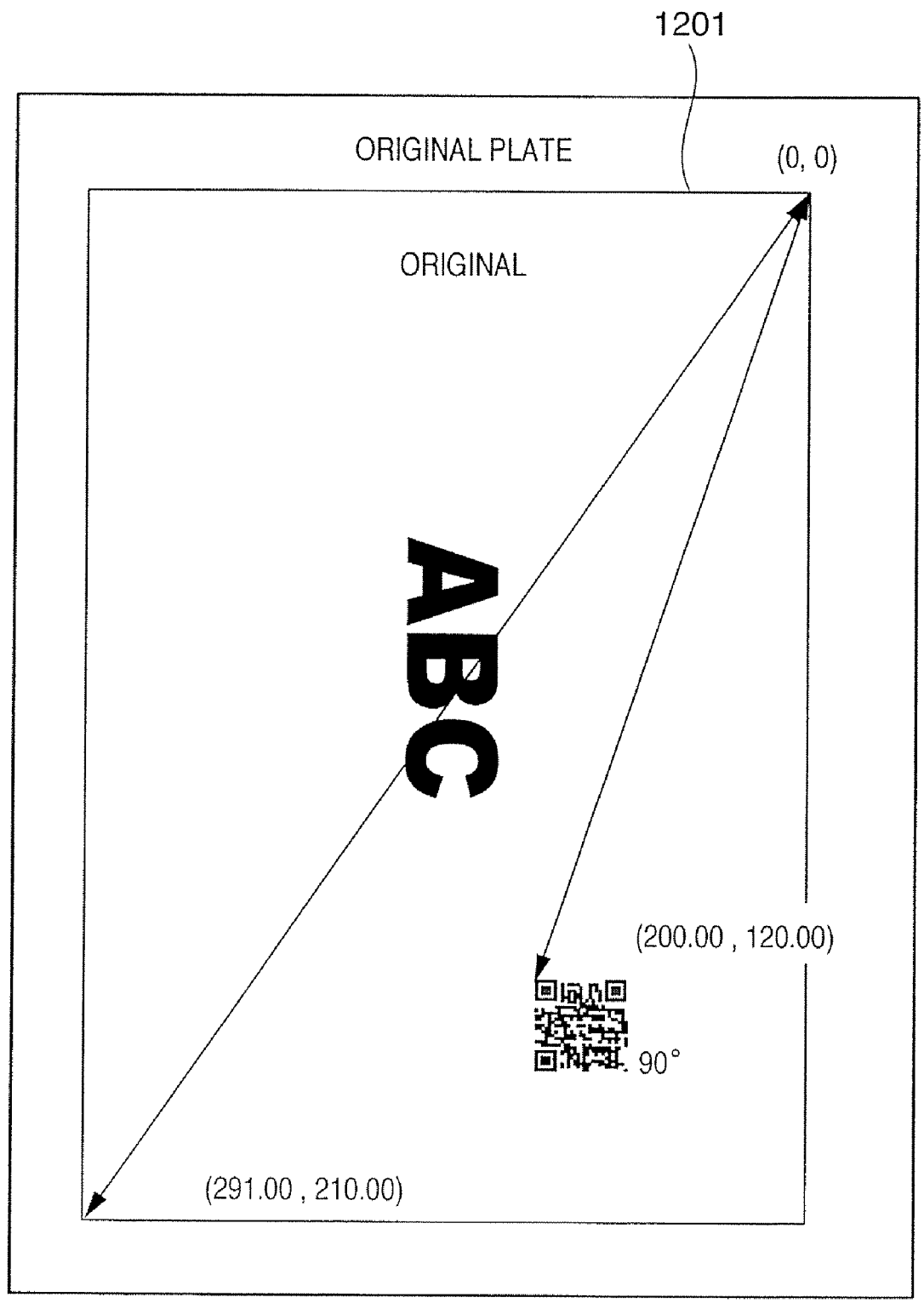
FIG. 12 is a view exemplifying another one of four cases in which the direction of characters of a text original is different from the reference direction 303 of the information code.
Figure 13:
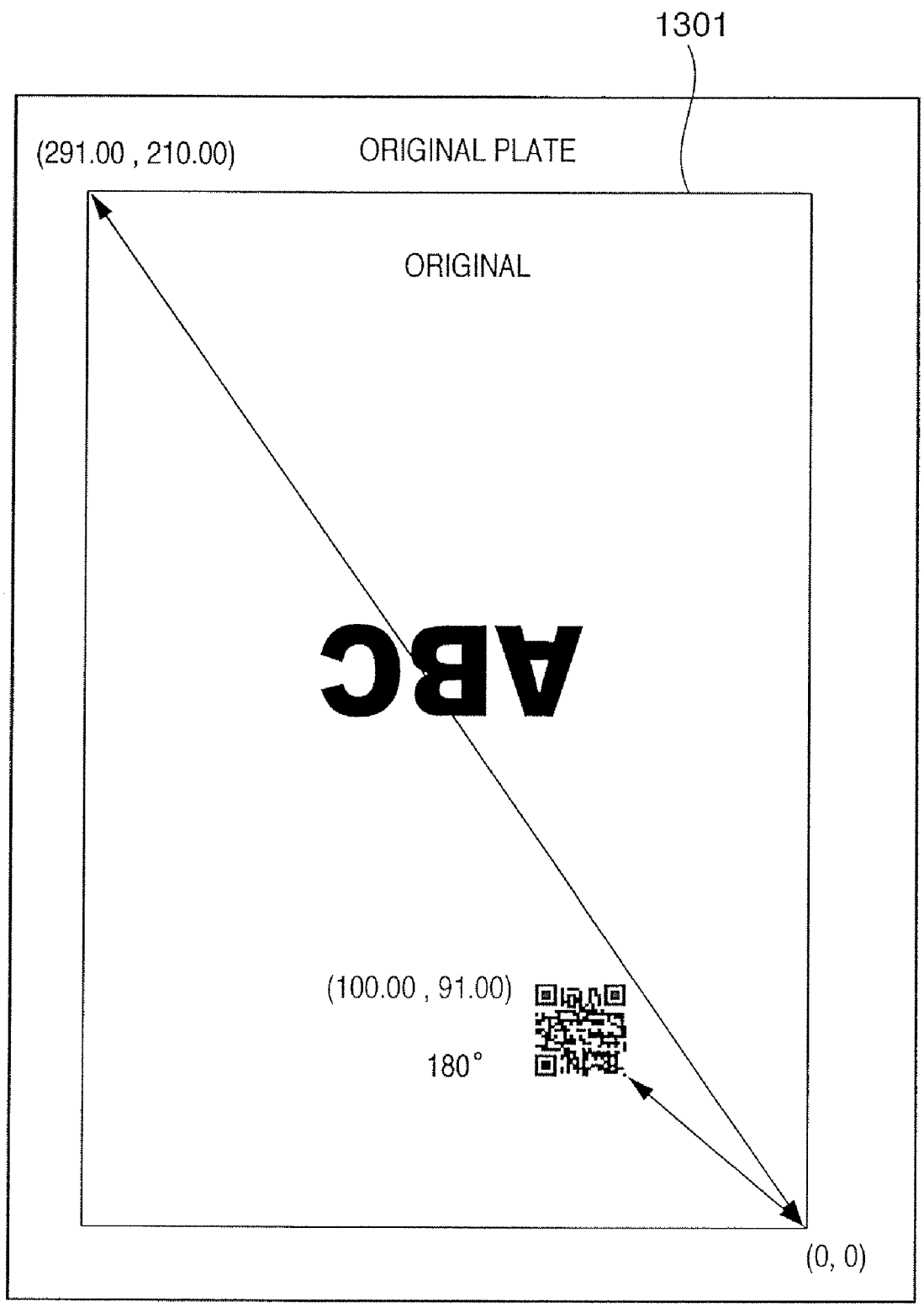
FIG. 13 is a view exemplifying yet another one of four cases in which the direction of characters of a text original is different from the reference direction 303 of the information code.
Figure 14:
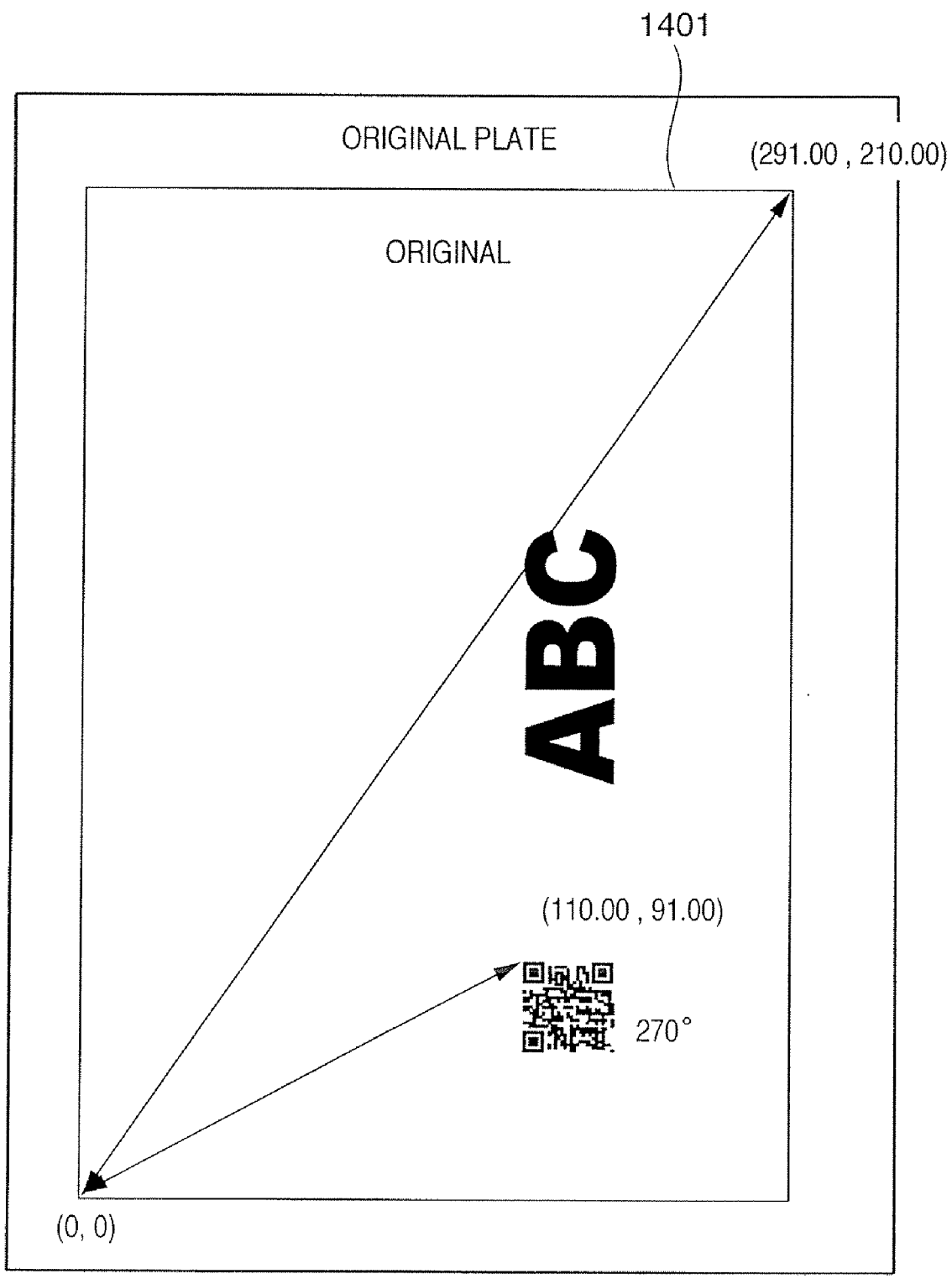
FIG. 14 is a view exemplifying yet another one of four cases in which the direction of characters of a text original is different from the reference direction 303 of the information code.

FIG. 11 shows a case in which an original 1101 on the original plate is set at a normal position. In case of the normal position, the coordinates of the origin are set at the upper left corner on a preview image. FIG. 12 shows a case in which an original 1201 is rotated clockwise from the normal position through 90°. When the original is rotated clockwise from the normal position through 90°, the coordinates of the origin are set at the upper right corner on a preview image. FIG. 13 shows a case in which an original 1301 on the original plate is rotated clockwise from the normal position through 180°. When the original is rotated clockwise from the normal position through 180°, the coordinates of the origin are set at the lower right corner on a preview image. FIG. 14 shows a case in which an original 1401 on the original plate is rotated clockwise from the normal position through 270°. When the original is rotated clockwise from the normal position through 270°, the coordinates of the origin are set at the lower left corner on a preview image.

As described above, according to the first embodiment, a reading region is designated based on the relative position with reference to the position and direction of the information code 301. With this arrangement, even when the boundary between the original and original plate is hard to be detected, an accurate reading region can be set.

In the above description, the information code 301 is recorded on a print medium as an original in a visible state. However, the information code need not always be visible, and may be recorded in a state in which it can be read by a sensor other than visible light such as infrared rays, ultraviolet rays, or the like.

(Modification 1)

Additional processing to be executed when the original laps from the original plate will be explained below as modification 1.

Figure 15:
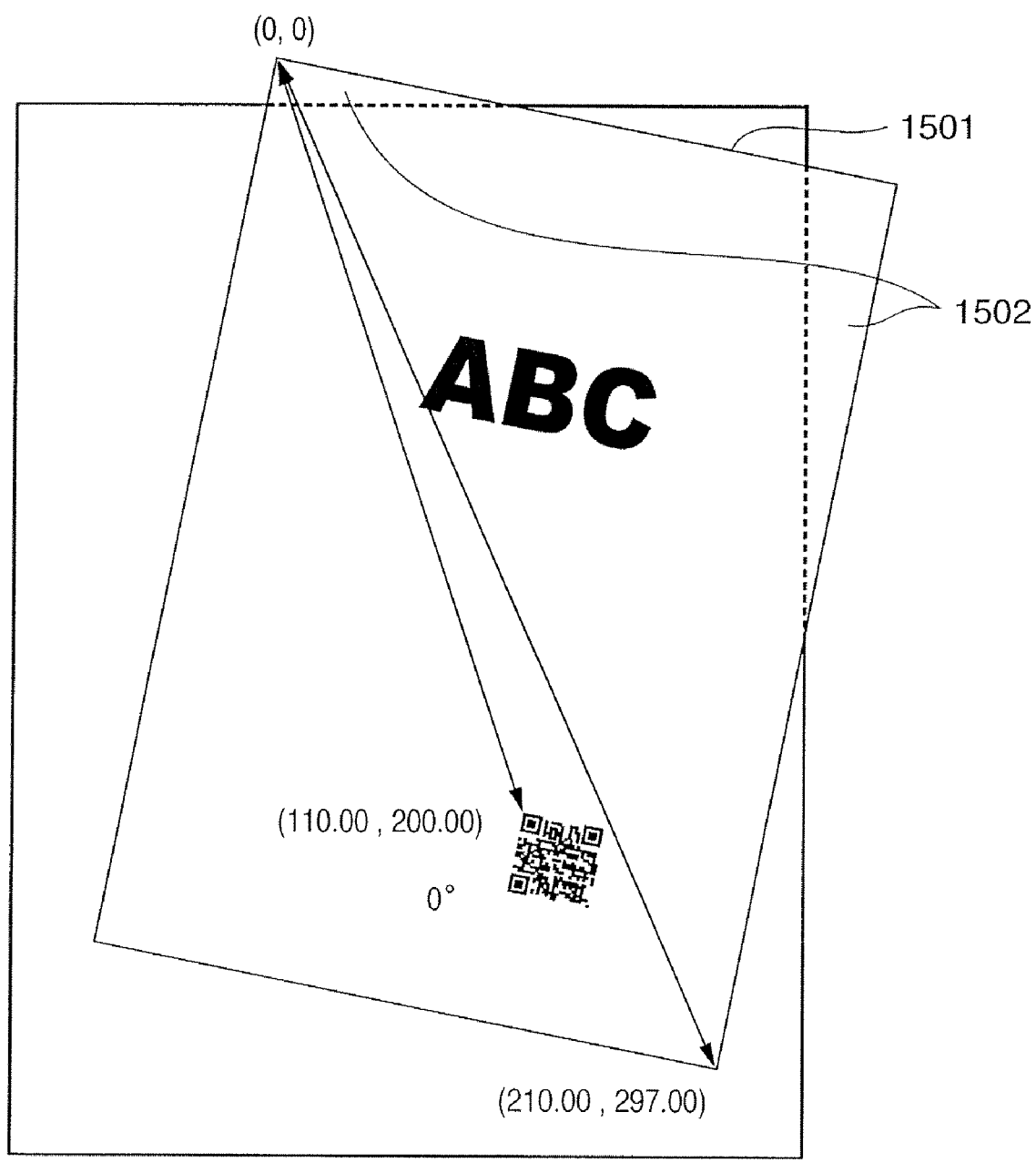
FIG. 15 is a view exemplifying a state in which a part of an original laps from the region of the original plate.

FIG. 15 exemplifies a state in which a partial region of an original 1501 laps from the region of the original plate 402. Note that a specific region indicated by the information code 301 is the full surface of the original 1501. Since regions 1502 in the original 1501 are not located on the original plate 1402 (i.e., a readable range), the regions 1502 (lap regions) cannot be read, and no image information can be acquired.

However, the shapes of the regions 1502 can be derived by arithmetic operations from the information of the specific region indicated by the information code 301. Hence, in modification 1, the regions that cannot be read are supplemented by specific images (image supplement means).

Figure 16:
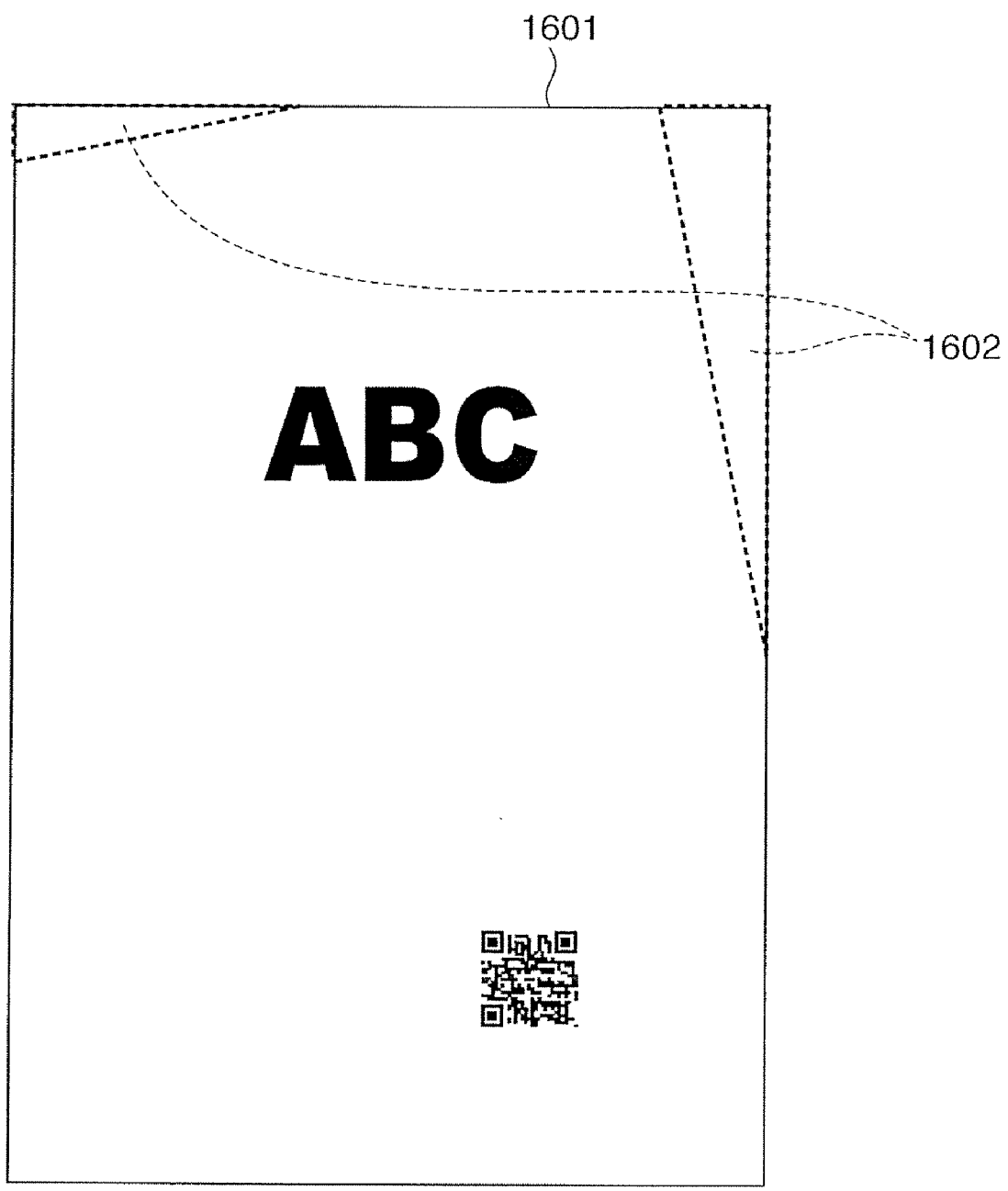
FIG. 16 is a view exemplifying an output result image according to modification 1.

FIG. 16 exemplifies an output result image when the original is read in the state shown in FIG. 15. Reference numeral 1602 denotes regions from which no image information is acquired since they are not located on the original plate 402, i.e., the regions corresponding to the aforementioned regions 1502. In this modification, the regions 1602 are padded with white image (pixel) data. Furthermore, the image information undergoes rotation processing to have a normal direction. Note that the image data for the regions to be supplemented is not limited to white image data. For example, partial data in the acquired image information may be copied to supplement the regions.

(Modification 2)

Additional processing to be executed when a plurality of information codes are recorded on an original will be described below as modification 2.

FIG. 17 shows an example of the display contents on the reading setting window to be displayed on the display 6. A case will be explained below wherein the original 401 includes two information codes 301. An information code 301a stores, as a specific region, a region 1701 corresponding to the full surface of the original, and an information code 301b stores, as specific regions, four rectangular regions 1702 laid out on the original.

In order to select and designate one or more regions from a plurality of regions, this window in FIG. 17 includes an image setting area 1703 in place of the image setting area 1006 shown in FIG. 10. The image setting area 1703 accepts selection when the user inputs numerical values using the keyboard 7. Also, the user can delete an unnecessary reading region by selecting it using the mouse or the like and pressing a Delete key or the like on the keyboard 7. FIG. 17 shows an example in which one original 401 includes two information codes 301a and 301b. Alternatively, one original may include one information code 301 which includes a plurality of pieces of specific region information, thus allowing the same operations as described above.

Second Embodiment

The second embodiment will explain an efficient modification determination method using an information code.

<Information Code Image>

The second embodiment will explain an image reading apparatus which uses an information code that stores original size information, information of an information code print region, and information of a save location of a source original file in addition to information of regions to be read. When the information code includes these kinds of information, an effect of automatically determining a required original based on the read original, and saving the determined original can be expected.

Figure 18:
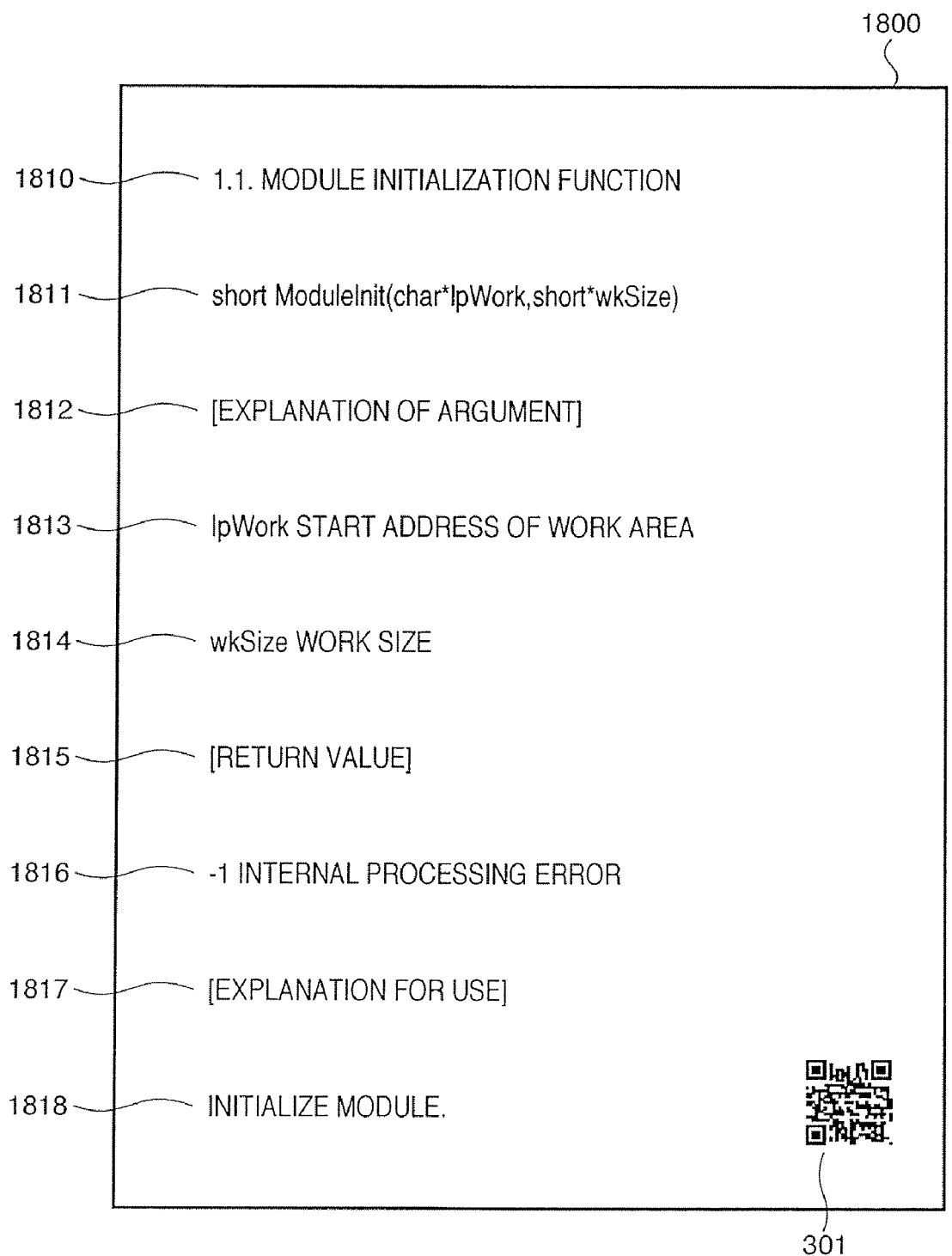
FIG. 18 shows an example of an original to be read by an image reading apparatus according to the second embodiment.

FIG. 18 shows an example of an original to be read by the image reading apparatus according to the second embodiment. Reference numeral 1800 denotes an original; and 1810 to 1818, character strings printed on the original. An information code 301 is printed on the original 1800.

Figure 19:
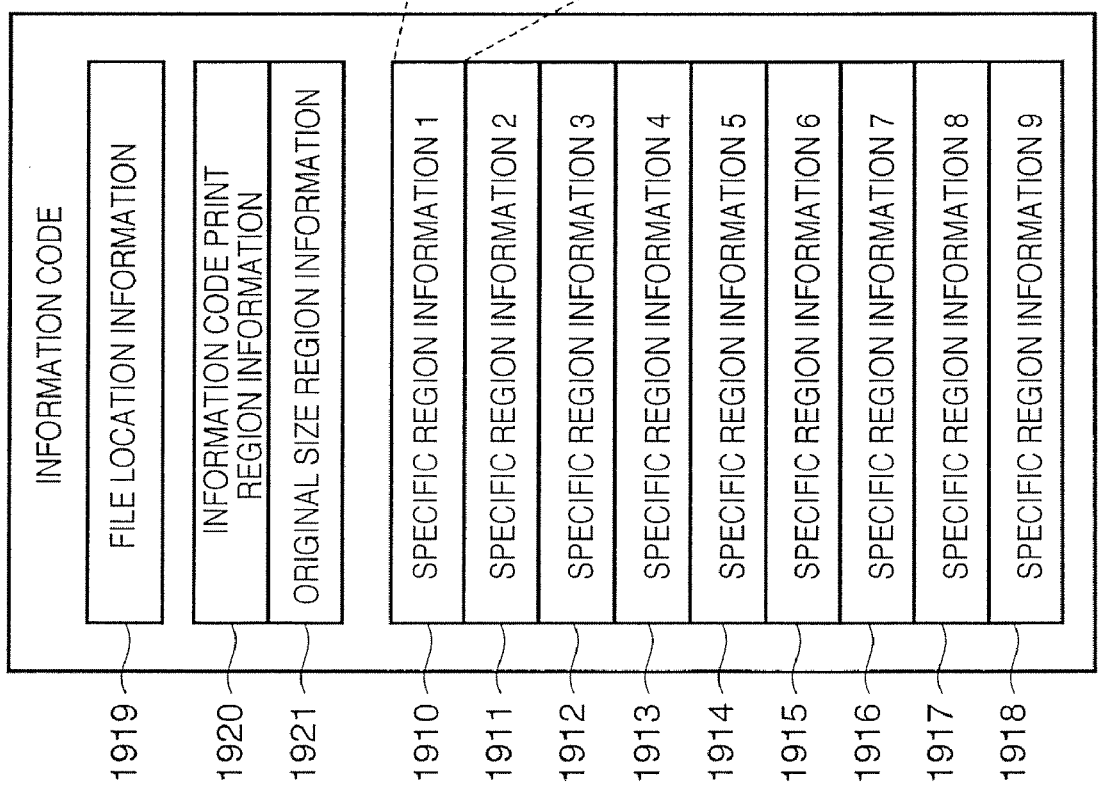
FIG. 19 is a view for explaining a data structure which is encoded and stored in the information code.

FIG. 19 is a view for explaining a data structure which is encoded and stored in the information code printed on the original 1800.

Reference numerals 1910 to 1918 denote nine pieces of specific region information, which respectively hold region information of the character strings 1810 to 1818 on the original 1800. Reference numeral 1919 denotes file location information which holds a file name of an original digital file corresponding to the original 1800, and path information of that digital file in the external storage device 12. Reference numeral 1920 denotes information code print region information which holds region information of the information code 301. Reference numeral 1921 denotes original size region information which holds original size information of the original 1800.

Note that each of the specific region information 1910 to 1918 includes the specific region size information 602, relative position information 603, and relative angle information 604 as that in the first embodiment. Note that the information code print region information 1920 and original size region information 1921 also have the same data structure.

Figure 20:
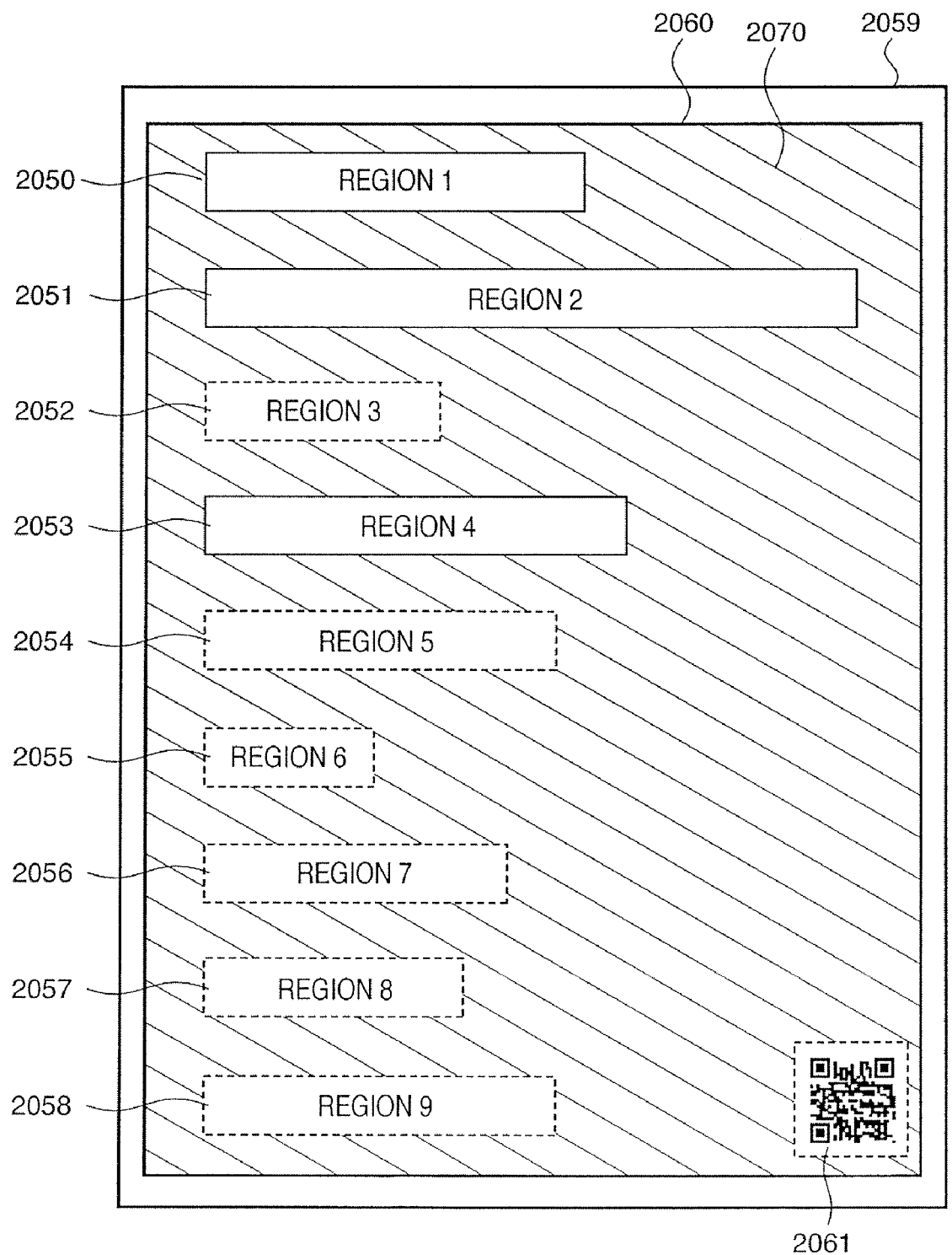
FIG. 20 is a view for explaining various kinds of region information.

FIG. 20 is a view for explaining various kinds of region information on the original 1800. Reference numeral 2059 denotes image data which is scanned to have a size of the original plate. Reference numerals 2050 to 2058 denote character string regions corresponding to the character strings 1810 to 1818 on the original 1800; and 2060, an original size region. Furthermore, reference numeral 2061 denotes an information code print region that represents the print region of the information code 301. Reference numeral 3070 denotes a mask region which masks the regions of the character string regions 2050 to 2058 and the information code print region 2061.

<Operation of Image Reading Apparatus>

Figure 21A:
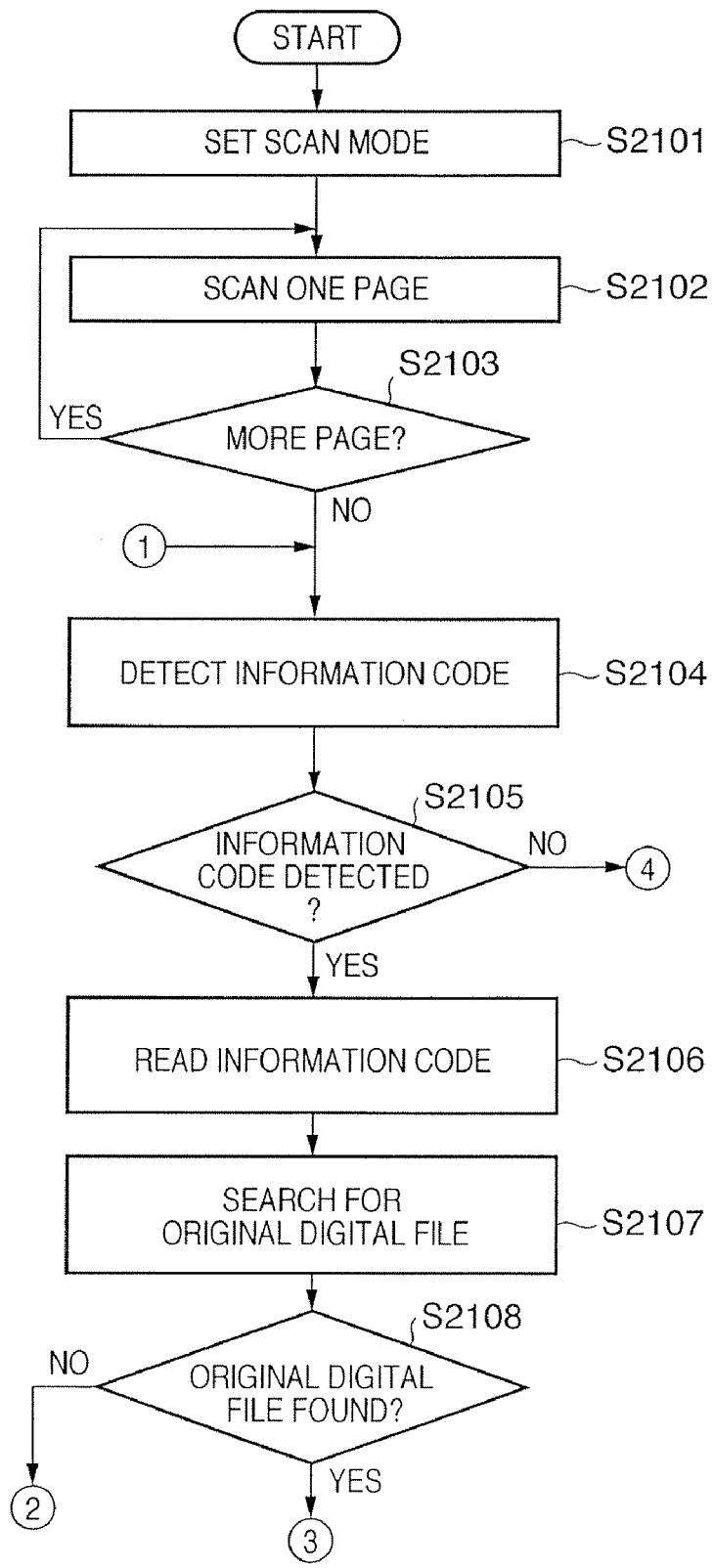
FIGS. 21A and 21B are processing flowcharts of the image reading apparatus according to the second embodiment.
Figure 21B:
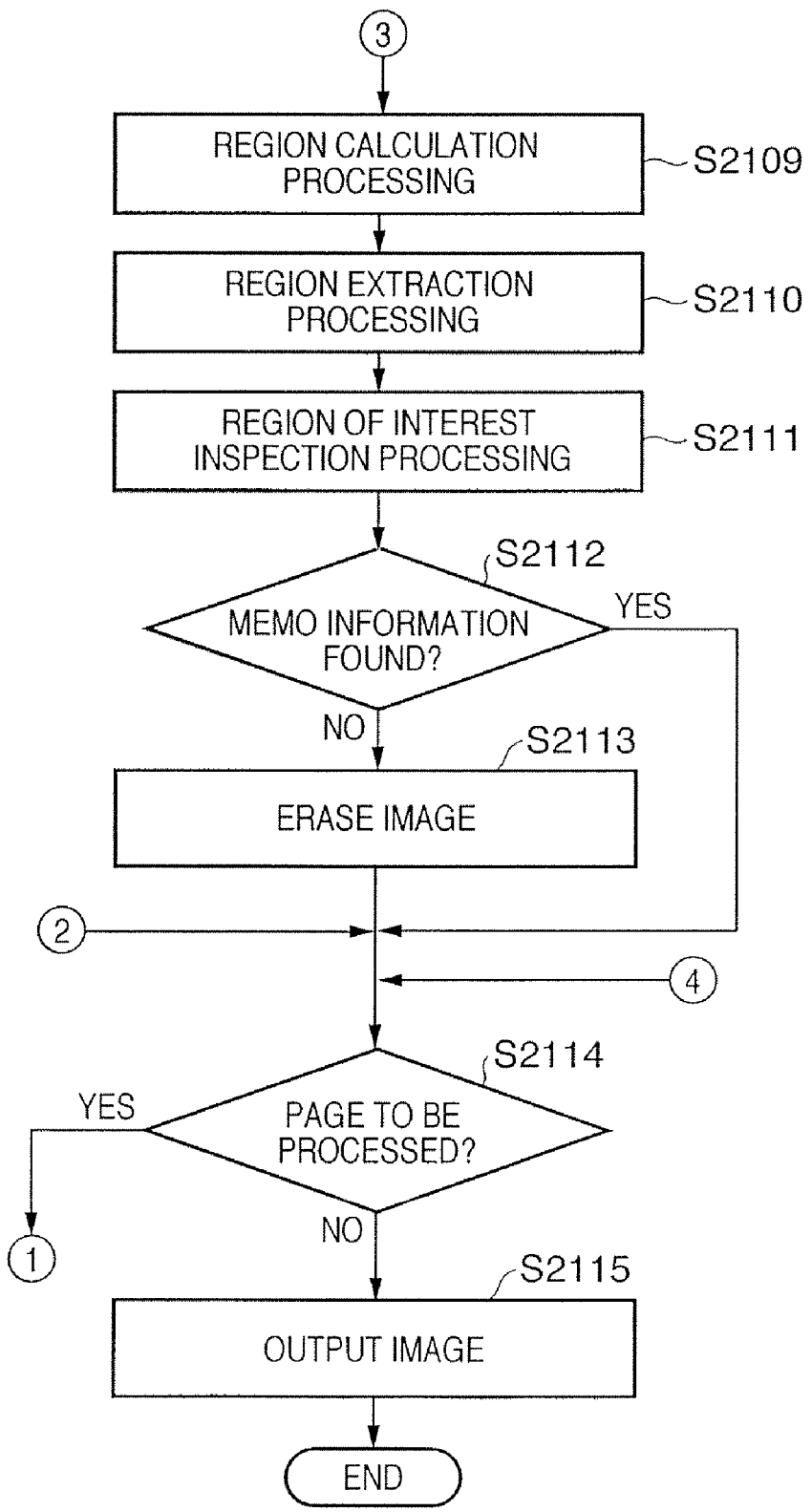

FIG. 21 is a flowchart showing the processing of the image reading apparatus according to the second embodiment. A case will be explained below wherein a hand-written modification is applied to the original 1800 as a paper original obtained by outputting an original digital file. Note that the following steps are implemented when the CPU 2 executes a program to control the host computer 1 or scanner 16.

Note that an auto original feeder (ADF (not shown)) is equipped on the scanner 16 to allow continuous reading. In an example to be described below, an information code as that on the original 1800 is appended to each page, and processing is done for each page.

In step S2101, the scanner driver 15 accepts reading settings upon scanning such as the original type 1008, color mode 1010, and the like. The scanner driver 15 may accept settings via the UI shown in FIG. 10 by user's operations or from another external device. Assume that "original plate full surface" is selected as the original size setting.

In step S2102, the scanner driver 15 scans one page of originals set on the ADF based on the setting values set in step S2101, and saves image data as a digital file in the external storage device 12.

The scanner driver 15 checks in step S2103 if originals to be scanned still remain on the ADF. If originals to be scanned remains, the process returns to step S2102 to scan an image for one page. That is, originals set on the ADF are read in turn, and image data for respective pages are held in the external storage device as digital files. If all originals set on the ADF have been read, the process advances to step S2104.

In step S2104, the scanner driver 15 temporarily reads out one page of image data, which are held in the external storage device 12 as digital files, onto the RAM 4. The scanner driver 15 then applies the information code detection processing corresponding to step S503 of the first embodiment to the readout image data. If the information code is detected, position information of a reference point and reference direction of the information code are temporarily stored in the RAM 4.

The scanner driver 15 checks in step S2105 if the information code is detected in step S2104. If the information code is detected, the process advances to step S2106; otherwise, the process jumps to step S2114.

In step S2106, the scanner driver 15 acquires the file location information 1919, information code print region information 1920, original size region information 1921, and respective pieces of specific region information 1910 to 1918 from the information code, and temporarily stores them in the RAM 4.

In step S2107, the scanner driver 15 searches the location indicated by the file location information 1919 stored in the RAM 4 in step S2106. That is, the scanner driver 15 searches based on the file name of an original digital file and a path name indicating the location in the external storage device 12.

The scanner driver checks in step S2108 if an original digital file of the read image data is found, as a result of search in step S2107. If the original digital file is found, the process advances to step S2109; otherwise, the process jumps to step S2114.

In step S2109, the scanner driver 15 calculates the regions of the character strings and information code printed on the original and the region of the original in the image data based on the information of the information code acquired in step S2104 and various regions acquired in step S2106. Note that this calculation processing is the same as step S509 in the first embodiment.

In step S2110, the scanner driver 15 extracts a region of interest so as to determine the read paper original is modified. More specifically, as a result of calculations of the respective regions in step S2109, the region of the original 1800, the character string regions 2050 to 2058 as the regions of the character strings 1810 to 1818, and the information code print region 2061, which are printed on the original 1800, are obtained. For this reason, using these regions, the mask region 2070 as the region of interest is determined.

In step S2111, the scanner driver 15 detects any modification from the mask region 2070 on the read paper original determined in step S2110. More specifically, significant pixels on the mask region, RGB components of which are equal to or higher than a pre-set threshold, are detected.

The scanner driver 15 checks in step S2112 if a modification has been applied to the read paper original. More specifically, the scanner driver 15 checks if a designated number of significant pixels or more are detected in step S2111. As a result, if it is determined that a modification has been applied to the read paper original, the process jumps to step S2114; otherwise, the process advances to step S2113.

In step S2113, the scanner driver 15 discards the digital file which corresponds to the image data which is being currently processed and is saved in the external storage device 12.

The scanner driver 15 checks in step S2114 if digital files to be processed, which correspond to respective pages held as files in the external storage device 12, still remain. If digital files to be processed still remain, the process returns to step S2104 to repeat the processes in steps S2104 to S2113. On the other hand, if no digital file to be processed remains, the process advances to step S2115.

In step S2115, the scanner driver 15 generates, for example, a single PDF (Portable Original Format) file from the digital file which remains stored in the external storage device 12. The scanner driver 15 saves the generated PDF file at the same location as the original digital file in the external storage device 12.

By configuring the image reading apparatus to execute the aforementioned operations, the presence/absence of a modification to a paper original can be determined by only processes for the read original. That is, the presence/absence of a modification can be determined by checking whether or not significant pixels are detected from a region of an original digital file, which did not include any significant pixels before. For this reason, the processing load can be reduced, and the processing time can also be shortened.

Other Embodiments

The preferred embodiments of the present invention have been explained, and the present invention may be applied to either a system constituted by a plurality of devices, or an apparatus consisting of a single device.

Note that the present invention can also be achieved by directly or remotely supplying a program that implements the functions of the aforementioned embodiments to a system or apparatus, and reading out and executing the supplied program code by that system or apparatus. Therefore, the technical scope of the present invention also includes the program code itself to be installed in a computer so as to make computer implement the functional processing of the present invention.

In this case, the form of program is not particularly limited, and an object code, a program to be executed by an interpreter, script data to be supplied to an OS, and the like may be used as long as they have the program function.

As a recording medium for supplying the program, for example, a Floppy® disk, hard disk, optical disk (CD, DVD), magneto-optical disk, magnetic tape, nonvolatile memory card, ROM, and the like may be used.

The functions of the aforementioned embodiments can be implemented when the computer executes the readout program. In addition, an OS, which runs on the computer, executes some or all of actual processes based on an instruction of the program, thereby implementing the functions of the aforementioned embodiments.

Furthermore, the program read out from the recording medium is written in a memory of an expansion board or a function expansion unit, which is inserted in or connected to the computer. After that, a CPU or the like equipped on that function expansion board or unit executes some or all of actual processes, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-271303 filed Oct. 2, 2006 and 2007-155722 filed Jun. 12, 2007, which are hereby incorporated by reference herein in their entirety.

What is claimed is:

1. An image processing apparatus which reads an original placed on an original plate as digital image data using an image reading unit, comprising:
    a detection unit adapted to detect a code image, which is recorded on an original and includes reading setting information, from an image read by a prescan using the image reading unit;
    an extraction unit adapted to extract the reading setting information from the detected code image; and
    a reading control unit adapted to execute a main scan using the image reading unit based on the extracted reading setting information,
    wherein the reading setting information includes reading range information designated by a relative position to the original that records the code image with reference to a position and a direction of the code image.

2. The apparatus according to claim 1, wherein the relative position is expressed by a reference point, a size, and a rotation angle with reference to the position and the direction of the code image.

3. The apparatus according to claim 1, wherein the reading range information is range information corresponding to a full surface of the original, and
    said apparatus further comprises an image supplement unit adapted to supplement, when a range indicated by the reading range information laps from a readable range of the image reading unit, a lap region of the image data which is read by said reading control unit by an image designated in advance.

4. The apparatus according to claim 1, wherein the reading range information includes a plurality of pieces of range information of the original, and said apparatus further comprises a designating unit adapted to select and designate at least one range information from the plurality of pieces of range information.

5. A method of controlling an image processing apparatus which reads an original placed on an original plate as digital image data using an image reading unit, comprising:

a detection step of detecting a code image, which is recorded on an original and includes reading setting information, from an image read by a prescan using the image reading unit;

an extraction step of extracting the reading setting information from the detected code image; and a reading control step of executing a main scan using the image reading unit based on the extracted reading setting information, wherein the reading setting information includes reading range information designated by a relative position to the original that records the code image with reference to a position and a direction of the code image.

6. The method according to claim 5, wherein the relative position is expressed by a reference point, a size, and a rotation angle with reference to the position and the direction of the code image.

7. The method according to claim 5, wherein the reading range information is range information corresponding to a full surface of the original, and said method further comprises an image supplement step of supplementing, when a range indicated by the reading range information laps from a readable range of the image reading unit, a lap region of the image data which is read in the reading control step by an image designated in advance.

8. The method according to claim 5, wherein the reading range information includes a plurality of pieces of range information of the original, and said method further comprises a designating step of selecting and designating at least one range information from the plurality of pieces of range information.

9. A program stored in a computer-readable storage medium to make a computer execute a control method of an image processing apparatus according to claim 5.

10. A reading method in an image reading system, which comprises a reading unit adapted to read an original placed on an original plate as image information according to reading setting information, and an information code detection unit adapted to detect an information code from the image information, comprising:

a step of acquiring size information of a specific region from the information code detected by the information code detection unit;

a step of acquiring relative position information of the information code to the specific region from the information code;

a step of generation the reading setting information based on the size information and the relative position information, and extracting information of the specific region from the image information; and a step of determining the presence/absence of a modification to the placed original based on the extracted information of the specific region, wherein the image information is discarded if the absence of a modification is determined in the determining step, and the image information is saved if the presence of a modification is determined in the determining step.

11. The method according to claim 10, further comprising a step of acquiring, from the information code, information associated with a save location of an original digital file corresponding to the original that records the information code, wherein the image information is saved at the save location if the determined in the determining step.

* * * * *